(12) United States Patent
Kudo

(10) Patent No.: US 12,211,130 B2
(45) Date of Patent: Jan. 28, 2025

(54) PROGRAM, INFORMATION PROCESSING METHOD, SERVER, AND SERVER INFORMATION PROCESSING METHOD

(71) Applicant: GREE, INC., Tokyo (JP)

(72) Inventor: Yoshiki Kudo, Tokyo (JP)

(73) Assignee: GREE, INC., Tokyo (JP)

( * ) Notice: Subject to any disclaimer, the term of this patent is extended or adjusted under 35 U.S.C. 154(b) by 232 days.

(21) Appl. No.: 17/891,856

(22) Filed: Aug. 19, 2022

(65) Prior Publication Data

US 2023/0101386 A1   Mar. 30, 2023

(30) Foreign Application Priority Data

Sep. 30, 2021 (JP) ................................. 2021-160906

(51) Int. Cl.
*G06T 11/60* (2006.01)

(52) U.S. Cl.
CPC .................... *G06T 11/60* (2013.01)

(58) Field of Classification Search
CPC ................. G06T 11/60; Y02P 90/30
See application file for complete search history.

(56) References Cited

U.S. PATENT DOCUMENTS

2011/0124415 A1* 5/2011 Shimono ................. A63F 13/87
463/42
2021/0405831 A1* 12/2021 Mourkogiannis .... G06K 7/1413

FOREIGN PATENT DOCUMENTS

JP          2015-184689 A      10/2015

* cited by examiner

*Primary Examiner* — Said Broome
*Assistant Examiner* — Andrew Shin
(74) *Attorney, Agent, or Firm* — Oliff PLC

(57) ABSTRACT

A user device executes a first drawing process of outputting, to a display viewed by a user, a video in which registered parts associated with the user are applied to an avatar object that reflects movements of the user; a designation process of sending information designating a lottery target group including a plurality of lottery target parts to a server based on an operation to an input operation portion by the user; a trial parts acquisition process of acquiring trial parts data relating to a trial part preset as a part to be temporarily applied to the avatar object from among the parts included in the lottery target group; and a second drawing process of outputting, to the display, the avatar object to which the trial part has been automatically applied using the trial parts data.

11 Claims, 13 Drawing Sheets

|  |  |  |  | ~350 |
|---|---|---|---|---|
| USER ID | ACCOUNT NAME | COINS | POINTS | |
| *** | *** | 1000C | 500Pt | |
| *** | *** | 0C | 0Pt | |

| AVATAR | MODEL | HEIGHT | SKIN COLOR | BODY SHAPE | PARTS 1 (EYE) | .. |
|---|---|---|---|---|---|---|
| 1 | F TYPE | *** | *** | *** | *** | *** |
| 2 | M TYPE | *** | *** | *** | *** | *** |
| 3 | : | : | : | : | : | : |

351B, 351

| PART ID | ITEM NAME | ATTRIBUTE | COLOR | AVATAR |
|---|---|---|---|---|
| *** | FLOWER COLOR CONTACT LENSES | F TYPE | Blue | - |
| *** | HYDRANGEA DRESS | F TYPE | Purple | 2 |
| *** | WEATHER T-SHIRT | M TYPE | Black | 3 |
| *** | TRAPEZOID SKIRT | F TYPE | Black | 2 |
| *** | BERET | F TYPE | Black | - |
| : | : | : | : | : |

351C, 351

| PART ID | ITEM NAME | ATTRIBUTE | COLOR | AVATAR |
|---|---|---|---|---|
| *** | FIREWORKS WALLPAPER | - | Black | 2 |
| : | : | : | : | : |

FIG. 3

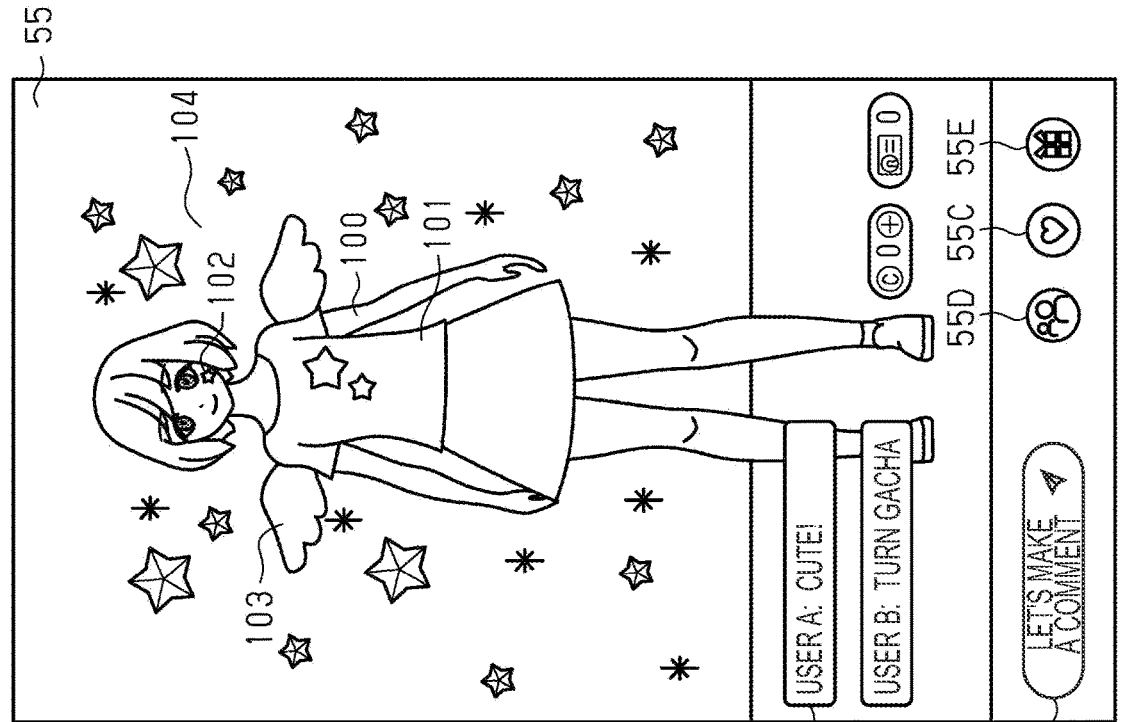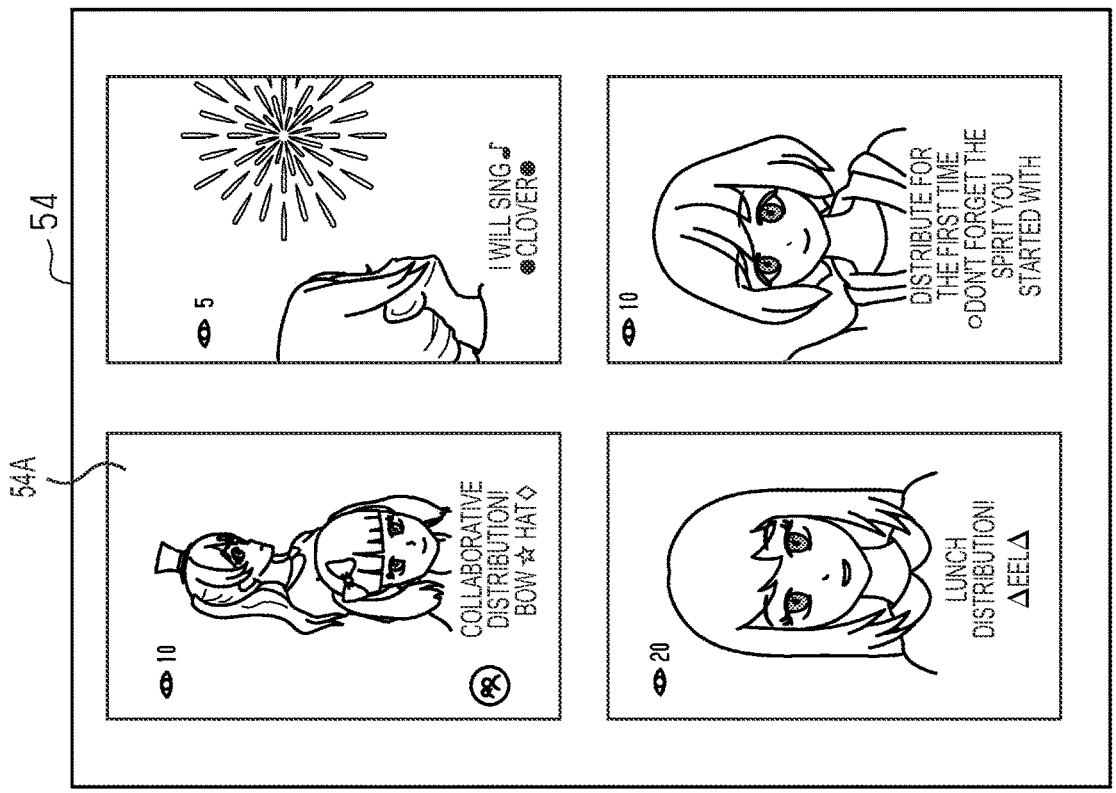
FIG. 11

PROGRAM, INFORMATION PROCESSING METHOD, SERVER, AND SERVER INFORMATION PROCESSING METHOD

This application claims the benefit of priority from Japanese Patent Application No. 2021-160906 filed Sep. 30, 2021, the entire contents of the prior applications being incorporated herein by reference.

TECHNICAL FIELD

This disclosure relates to a program, information processing method, server, and server information processing method that distributes or views video.

There is a known video distribution system that distributes video including animation of an avatar object that is based on movements of a distributing user (for example, see Patent Reference 1).

PATENT REFERENCE

[Patent Reference 1] JP 2015-184689A

SUMMARY

Problem to Be Resolved

In this video distribution system, a configuration that performs a lottery of rewards such as items and the like applied to an avatar object has been known. The rewards can expand the range of expression of the avatar object, but depending on the user, even if a user is interested in the rewards, interest may not reach the point of performing a lottery. If the opportunity to perform a lottery is lost in this way, distribution of the video tends to be standard, which may contribute to the user's diminishing interest in the video. Therefore, activating the distribution and viewing of a video through a lottery is desired.

Means of Solving Problem

A program that resolves the above problem causes one or a plurality of computers to execute: a first drawing process of outputting, to a display viewed by a user, a video in which registered parts associated with the user are applied to an avatar object that reflects movements of the user; a designation process of sending information designating a lottery target group including a plurality of the parts that are lottery targets to a server based on an operation to an input operation portion by the user; a trial parts acquisition process of acquiring trial parts data relating to a trial part preset as a part temporarily applied to the avatar object from among the parts included in the lottery target group; and a second drawing process of outputting, to the display, the avatar object to which the trial part has been automatically applied using the trial parts data.

An information processing method that resolves the above problem causes one or a plurality of computers to execute: a first drawing process of outputting, to a display viewed by a user, a video in which registered parts associated with the user are applied to an avatar object that reflects movements of the user; a designation process of sending information designating a lottery target group including a plurality of lottery target parts to a server based on an operation to an input operation portion by the user; a trial parts acquisition process of acquiring trial parts data relating to a trial part preset as a part temporarily applied to the avatar object from among the parts included in the lottery target group; and a second drawing process of outputting, to the display, the avatar object to which the trial part has been automatically applied using the trial parts data.

A server that resolves the above problem executes: a parts sending process of sending, to a user device, drawing data for drawing parts to be applied to an avatar object in which movements of a user are reflected; a designation receiving process of receiving, from the user device, information designating a lottery target group including a plurality of the parts that are lottery targets; a trial parts sending process of sending, to the user device, trial parts data related to a trial part preset as a part temporarily applied to the avatar object from among the parts included in the lottery target group; a lottery request receiving process of receiving, from the user device, an execution request for a lottery from the lottery target group; a lottery execution process of executing a lottery of a predetermined number of the parts from the lottery target group; and a lottery data sending process of sending, to the user device, lottery parts data associated with a lottery part drawn from the lottery target group.

A server information processing method that resolves the above problem is such that one or a plurality of computers executes: a parts sending process of sending, to a user device, drawing data for drawing parts to be applied to an avatar object in which movements of a user are reflected; a designation receiving process of receiving, from the user device, information designating a lottery target group including a plurality of the parts that are lottery targets; a trial parts sending process of sending, to the user device, trial parts data related to a trial part preset as a part temporarily applied to the avatar object from among the parts included in the lottery target group; a lottery request receiving process of receiving, from the user device, an execution request for a lottery from the lottery target group; a lottery execution process of executing a lottery of a predetermined number of the parts from the lottery target group; and a lottery data sending process of sending, to the user device, lottery parts data associated with a lottery part drawn from the lottery target group.

With the present disclosure, it is possible to increase opportunities for performing a lottery of parts applied to an avatar object.

BRIEF EXPLANATION OF DRAWINGS

FIG. 2 is a diagram showing user management data of the same embodiment.

FIG. 3 is a diagram showing registered parts data of the same embodiment.

FIG. 11 is a diagram showing another example of a viewing screen of the same embodiment.

MODES FOR IMPLEMENTING THE DISCLOSURE

First Embodiment

Hereinafter, a first embodiment of a program, an information processing method, a server, and a server information processing method will be described by way of exemplifying a video distribution system. The video distribution system displays an animation including an avatar object that reflects a user's movement on (i) a user device used by a user and (ii) a user device used by another user.

<Information Processing System>

Figure 1:
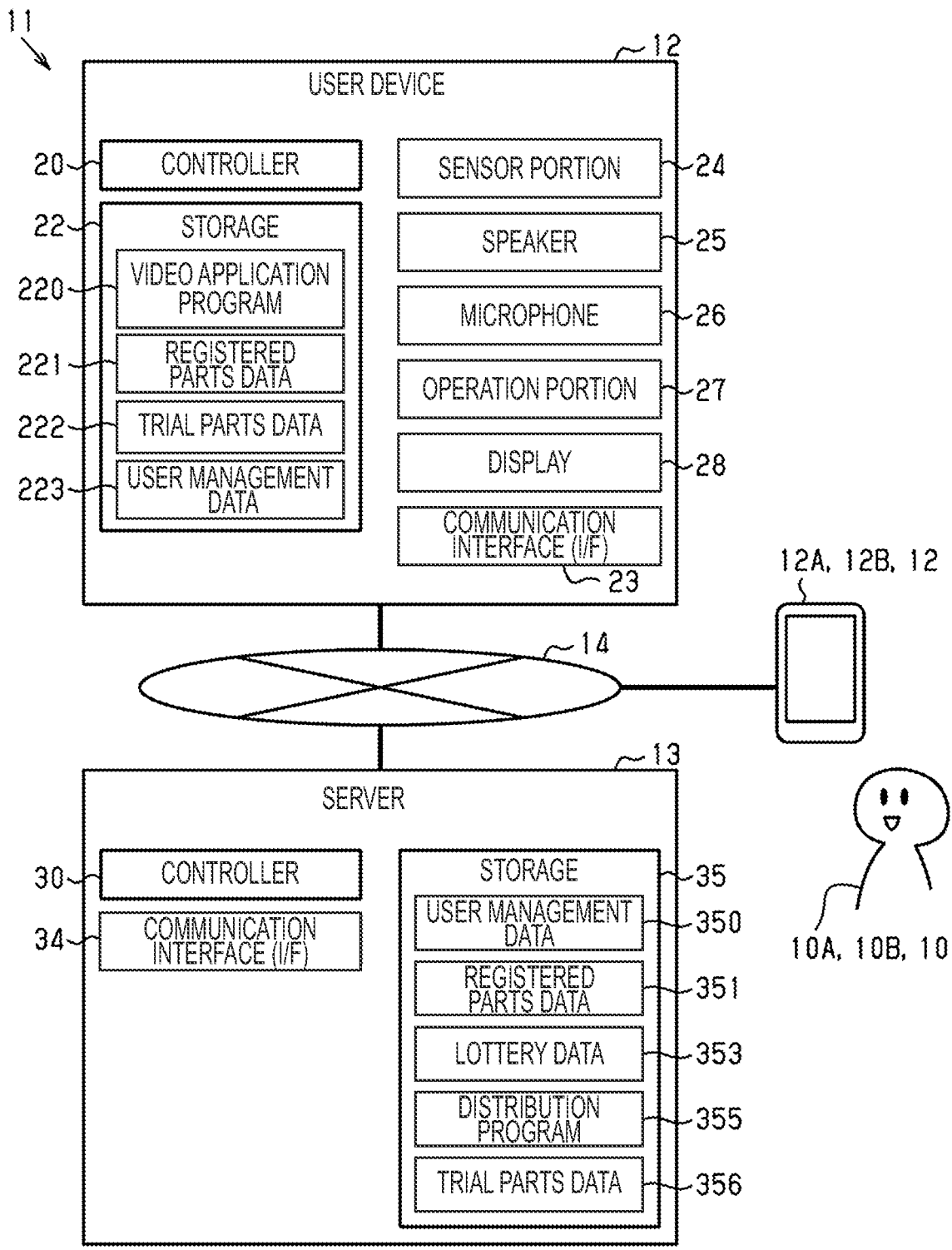
FIG. 1 is schematic view showing an embodiment of an information processing system in a first embodiment.

An information processing system 11 will be described with reference to FIG. 1. The information processing system 11 includes user devices 12 and a server 13. A plurality of the user devices 12 and the server 13 send and receive data via a network 14, and through this a video distributed by one user device 12 is distributed to another user device 12. A video application program 220 for viewing and distributing a video is installed on the user devices 12. Hereinafter, a user who distributes a video is called a distributing user 10A, and a user 10 who views a video distributed by the distributing user 10A is called a viewing user 10B. That is, a user 10 can be both a distributing user and a viewing user, and is a viewing user 10B when viewing a video and is a distributing user 10A when distributing a video. Further, a user device 12 used by a distributing user is referred to as a distributing user device 12A, and a user device 12 used by a viewing user is referred to as a viewing user device 12B. When not distinguishing between the distributing user 10A and the viewing user 10B, or between the distributing user device 12A and the viewing user device 12B, such will be referred to simply as a user 10 and a user device 12.

The user device 12 is a smartphone (multifunctional telephone terminal), a tablet terminal, a personal computer, a game console, a head-mounted display, a wearable computer such as a spectacle-type wearable terminal, or an information processing device other than these devices that is capable of reproducing videos. The user device 12 may be a standalone device that operates independently, or may be composed of a plurality of devices that are connected to each other so as to be able to send and receive various data.

The user device 12 includes a controller 20, a storage 22 (memory medium), and a communication interface (I/F) 23. The controller 20 includes one or a plurality of arithmetic circuits such as a CPU (Central Processing Unit), a GPU (Graphics Processing Unit), an NPU (Neural network Processing Unit) or the like. Further, the controller 20 includes a memory which is a main memory device (memory medium) on which the arithmetic circuit can read and write. The memory is composed of a semiconductor memory or the like. The controller 20 reads the operating system and other programs from the storage 22 or an external storage into the memory, and executes instructions retrieved from the memory. The communication I/F 23 can send data to and receive data from the server 13 and other user devices 12 via the network 14. The network 14 includes various networks such as a local area network, the Internet, or the like.

The storage 22 is an auxiliary memory device (memory medium), and is, for example, a memory medium such as a magnetic disk, an optical disk, a semiconductor memory, or the like. For the storage 22, a plurality of storages can also be used in combination. The video application program 220, registered parts data 221 to draw an avatar object, trial parts data 222 and user management data 223 are stored in the storage 22.

By executing the video application program 220, the controller 20 switches between a distribution mode in which the user 10 himself/herself distributes a video based on an input operation from an operation portion 27 of the user 10, and a viewing mode in which another distributing user 10A views the video that is distributed.

Further, the user device 12 includes a sensor portion 24, a speaker 25, a microphone 26, an operation portion 27 as an input operation portion, and a display 28. At least one of the sensor portion 24, the speaker 25, the microphone 26, the operation portion 27, and the display 28 may be provided as the same device as the controller 20, or may be provided in a state of being connected to the controller 20.

The sensor portion 24 is one or a plurality of sensors that detect a facial motion indicating a change in the facial expression of the user 10 and a body motion indicating a change in the relative position of the user's 10 body with respect to the sensor portion 24. Facial motion includes movements such as blinking and opening and closing of the mouth. A known device can be used the sensor portion 24. Examples of the sensor portion 24 include a ToF sensor that measures and detects the time of flight until light emitted toward the user 10 is reflected on the user's 10 face and returns, a camera that captures the user's 10 face, and an image processor that processes data captured by the camera. Further, the sensor portion 24 may include an RGB camera that captures visible light and a near-infrared camera that captures near-infrared rays. For the RGB camera and the near-infrared camera, for example, "True Depth" on the "iPhone X (registered trademark)" or "LIDAR" (Light Detection and Ranging, or Laser Imaging Detection and Ranging) on the "iPad Pro (registered trademark)" or the like, or other ToF sensors mounted on smartphones, can be used. Specifically, this camera projects tens of thousands of invisible dots (points) on the user's 10 face or the like by a dot projector. Then, the reflected light of the dot pattern is detected and analyzed, a depth map of the face is formed and an infrared image of the face or the like is captured to capture accurate face data. The arithmetic processor of the sensor portion 24 generates various items of information based on the depth map and the infrared image, compares the information with registered reference data, and calculates the depth of each point of the face (the distance between each point and the near-infrared camera) and deviations in positions other than depth.

Further, the sensor portion 24 may have a function of tracking not only the user's 10 face but also the hands (hand tracking). The sensor portion 24 may further include a sensor other than the sensor described above, such as an acceleration sensor and/or a gyro sensor or the like. The sensor portion 24 may have a spatial mapping function that recognizes an object in a real space in which the user 10 exists based on the detection results of the ToF sensor described above and/or other known sensors, and maps the recognized object to a spatial map. Hereinafter, when the facial motion detection data and the body motion detection data are described without particular distinction, such will be simply referred to as "tracking data". The image processor of the sensor portion 24 may be provided by the controller 20.

The speaker 25 converts audio data into audio and outputs such. The microphone 26 inputs audio spoken by the user and converts such into audio data. The display 28 outputs various images in response to output instructions from the controller 20. As the operation portion 27, a device corresponding to the type of user device 12 can be used. An example of the operation portion 27 is a touch panel integrated with the display 28, and/or an operation button provided in the housing of the user device 12, a keyboard, a mouse, a controller the user 10 operates by hand, or the like. The controller may incorporate various known sensors such as an acceleration sensor or an inertial measurement sensor (IMU: Inertial Measurement Unit) such as a gyro or the like. Further, another example of the operation portion 27 may be a tracking device that specifies the movement of the user's 10 hands, the movement of the eyes, the movement of the head, the direction of the line of sight, and the like. In this aspect, for example, the user's 10 instructions may be determined based on the movement of the user's 10 hands, and video distribution can be started or stopped, or various operations can be executed such as the display of a message, an evaluation of a video, or the display of a predetermined object (for example, the below-described gift). If the sensor portion 24 also has an input interface function such as a hand tracking function, the operation portion 27 can be omitted.

<Server>

Next, the server 13 will be described. The server 13 is used by a service provider or the like that provides a service for distributing videos. The server 13 includes a controller 30, a communication I/F 34, and a storage 35. The controller 30 has one or a plurality of arithmetic circuits. The controller 30 has the same configuration as the controller 20 of the user device 12. Further, the communication I/F 34 and the storage 35 have the same configurations as in the user device 12. The server 13 may be composed of one device or may be composed of a plurality of devices. When the server 13 is composed of a plurality of devices, those devices are provided in a manner in which the functions of the controller 30 and various data stored in the storage 35 are distributed.

The storage 35 stores user management data 350, registered parts data 351, trial parts data 356, lottery data 353, and a distribution program 355. The user management data 350, the registered parts data 351 and the trial parts data 356 have a data structure common to the user management data 223, the registered parts data 221 and the trial parts data 222 stored in the user device 12. The lottery data 353 includes (i) drawing data of parts that are a lottery target (ii) and attribute data of drawing data.

In addition, the storage 35 stores drawing data as a master for drawing main body parts, attached parts, and non-attached parts, and attribute data thereof. Further, the storage 35 stores data that serves as a master for drawing an object such as a gift object.

(Data Structures)

Next, examples of the configuration of the data stored in the storage 35 of the server 13 will be described in detail with reference to FIG. 2 through FIG. 4. Because the data stored in the storage 35 of the server 13 and the data stored in the storage 22 of the user device 12 have the same structure, the data stored in the storage 35 of the server 13 will be described here.

FIG. 2 shows an example of the user management data 350. The user management data 350 is stored for each user. The user device 12 stores the user management data 223 of the user who uses the user device 12. The user management data 350 includes identification information of the user 10, an account name, coins as a purchase medium, points, and the like. The identification information of the user 10 may be any information as long as the server 13 can identify the user 10 or the user device 12. For example, the identification information may be at least one of an ID uniquely associated with the user, a registration ID associated with the user device 12, a device token, and the like. The coins are items that have been purchased by the user 10. The points are given to the user 10 at a predetermined timing, such as when distribution is performed, when a distribution is viewed, when the user participates in an event, or when an object or the like is sold.

FIG. 3 shows an example of the registered parts data 351. The registered parts data 351 is data related to the registered parts stored in association with the user 10, and is managed for each user 10. Registered parts are those that have already been registered in the user device 12 or the server 13 as parts that can be used by the user at an arbitrary timing. The registered parts data 351 includes drawing data and attribute data for drawing parts of an avatar object arranged in a virtual space, or parts applied to the avatar object. The registered parts data 351 includes data of parts that the user 10 has paid for and acquired, data of parts that do not require payment, and data of parts that have been acquired by lottery.

Here, the parts used in a video will be described. The parts include main body parts applied to the avatar object main body, attached parts displayed in a state of being attached to the avatar object, and non-attached parts displayed in a state of not being attached to the avatar object. The drawing data for drawing the parts is three-dimensional model data, and includes polygon data, skeleton data (bones) for expressing movement of the avatar object, texture data, and the like.

The main body parts will be explained. The user 10 can select favorite main body parts to form an avatar object. An avatar attribute is associated with the main body parts. The avatar attribute is, for example, a type such as "F type" or "M type". The attached parts that can be applied to the avatar object differ depending on the avatar attribute. In addition to "F type" and "M type", "adult", "child", and character type may be set as avatar attributes. The registered parts data 351 associated with one user 10 may include data for drawing a plurality of avatar object main bodies.

Further, the attached parts are parts that are applied to a predetermined part of the avatar object. The attached parts are classified into categories such as "tops", "shoes", "skirts", and the like. A plurality of attached parts belongs to each of the categories. The user 10 selects favorite attached parts from a plurality of attached parts according to the avatar attribute of the avatar object. Attribute data indicating parts of the avatar object is associated with the attached parts. The user device 12 applies the attached parts to the parts of the avatar object indicated by the attribute data. In addition to the clothes of the avatar object, the attached parts may be ones associated with a predetermined part of the avatar object, such as a "cup", a "mug", an "umbrella", or a "musical instrument". For example, the "cup" is associated with a hand part of the avatar object, and the avatar object holding the "cup" can be displayed by applying the "cup" part.

The non-attached parts are wallpaper or the like displayed in the background of the avatar object. The registered parts data 351 includes main body parts data 351A indicating main body parts, attached parts data 351B indicating attached parts, and non-attached parts data 351C indicating non-attached parts.

The main body parts data 351A includes a combination of main body parts selected by the user 10. The main body parts can be identified by a part ID, which is identification information assigned to each part. In the main body parts data 351A, for each user 10, for example, data of up to three avatars can be stored. The main body parts data 351A includes not only the combination of the main body parts but also the avatar attribute and the like for each avatar. For example, the main body parts data 351A includes attribute data such as height, body shape, skin color, and the like, in addition to avatar attributes such as "F type".

The attached parts data 351B includes a part ID, an item name, an avatar attribute, a color, and applied avatar identification information for each attached part. The item name is a name given to each part. The avatar attribute is an avatar attribute of the avatar object to which the part is applied. In addition to "F type" and "M type", the avatar attribute includes "normal type" that can be applied to both "F type" and "M type". For example, a part associated with an "F-type" avatar attribute is applied only to an "F-type" avatar object. "Color" indicates the color of the part. Some parts of the same type have different colors. For example, there are "white" parts and "black" parts as parts of the same "shirt" type, and different part IDs are assigned to each of these. Further, when the user 10 associates and saves the attached parts as those attached to an avatar object set by the user himself/herself by combining main body parts, the attached parts and the identification information of the avatar to be applied are associated with each other and registered. The avatar identification information is a number or the like assigned to each avatar. If the user 10 does not associate and save the attached parts as those being attached to the avatar object, the identification information of the avatar that is the application target is not associated therewith.

The non-attached parts data 351C includes a part ID, an item name, an avatar attribute, and a color for each non-attached part. The user device 12 acquires updated data of the registered parts data 221 from the server 13 at a predetermined timing, such as when the video application program 220 is started or when the screen transitions to a predetermined screen. When the user 10 associates and saves the non-attached parts as those attached to an avatar object set by the user himself/herself by combining the main body parts, the non-attached parts and the identification information of the avatar that is the application target are registered in association with each other.

Figure 4:
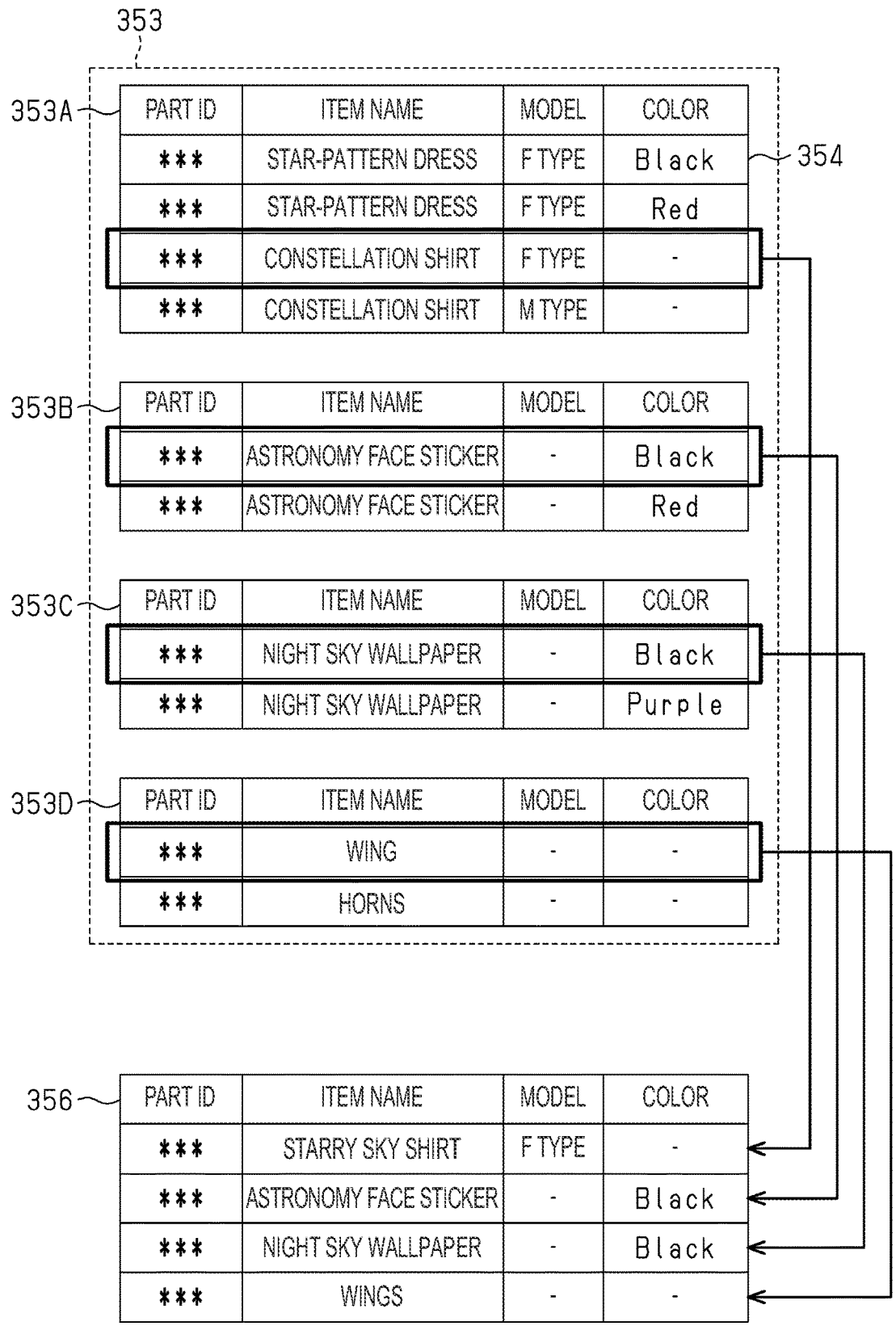
FIG. 4 is a diagram showing lottery target group and trial parts data of the same embodiment.

FIG. 4 shows an example of lottery data 353 and trial parts data 356. The lottery data 353 is data related to a plurality of lottery target groups (population). The lottery target groups each include a plurality of lottery target parts. The lottery data 353 includes drawing data for drawing the parts to be drawn, and attribute data thereof. The server 13 uses the lottery data 353 to select a lottery target group designated by the user from the plurality of lottery target groups (population). Further, the server 13 selects a predetermined number of parts from the selected lottery target group according to a predetermined lottery method based on a set probability. For example, a plurality of lottery target groups is set for each theme such as "Yusuzumi gacha" ("Evening Cool gacha") and "Yozora gacha" ("Night Sky gacha"), and each of the lottery target groups includes parts according to the set theme. FIG. 4 shows lottery data 353 of parts constituting one lottery target group.

The lottery data 353 includes lottery target data 354 indicating the lottery target parts. The lottery target data 354 is attribute data of the lottery target parts, and includes a part ID, an item name, an avatar attribute, and a color. For example, the lottery data 353A corresponding to the category of "tops" includes lottery target data 354 corresponding to attached parts such as "dress" and "shirt". Further, the lottery data 353A includes lottery target data 354 of attachment parts of the same type but different avatar attributes or colors. For example, the lottery data 353A includes lottery target data 354 of the type "dress" and different colors, to which different part IDs are assigned. Further, the lottery data 353A includes lottery target data 354 for attached parts whose type is "shirt" and whose avatar attributes are "F type" and "M type", respectively, and different part IDs are assigned to these. Further, the lottery data 353 exemplified in FIG. 4 includes lottery data 353B in the "face sticker" category, lottery data 353C in the "wallpaper" category, and lottery data 353D in the "attached system" category.

In addition to this, the lottery data 353 may have lottery target data 354 that expresses an emote function. The emote function is one of the processes that can be executed by the video application program 220, and is a component associated with various layers of parts such as the hands, arms, and head of the avatar object. When the user device 12 applies the component to the avatar object, the avatar object performs actions such as "applause", "waving", "joining hands", and "toasting". For example, "waving" is associated with a waving animation in the hierarchy of the "right hand" of an avatar object 100. Further, an avatar attribute of the avatar object 100 may be set as the application target of the emote function.

Further, the lottery data 353 may include additional parts that are additional "bonus" parts in addition to the lottery parts given by the lottery. The additional parts are selected regardless of the lottery probability of a lottery on the lottery target parts. There may be one or a plurality of additional parts. When there is a plurality of additional parts, the additional parts are selected according to predetermined conditions.

The trial parts data 356 is data related to trial parts, which are parts to be tried for the avatar object among the lottery target parts. In other words, the trial parts are parts that are temporarily applied or parts that are provisionally applied, and like the registered parts, can be applied only to the avatar object in a limited setting or time, but are not parts the user can continuously use in an arbitrary setting. The trial parts may include additional parts that are bonus parts. The trial parts data 356 shows a combination of trial parts, and the trial parts each belong to different categories. The trial parts are set by the provider of the trial parts or the provider of the video distribution service. For example, "shirt" is specified from the "tops" category, one face sticker is specified from the "face sticker" category, one wallpaper is specified from the "wallpaper" category, and "wings" is specified from the "accessory" category. The number of trial parts categories is not greater than the number of categories of the lottery data 353. That is, among the categories of the lottery data 353, there may be a category in which the trial parts are not selected. For convenience of explanation, the trial parts data 356 shown in FIG. 4 include an item name, an avatar attribute, and a color, but may include only a part ID.

The provider can specify any part as a trial part. The trial parts may be main body parts and non-attached parts in addition to attached parts. Further, a trial part may be a part having a rarity set for the part that is higher than a standard rarity. Alternatively, the trial parts may be parts whose lottery probability is lower than a reference value.

(User Device Processing)

Next, processing executed by the user device 12 executing the video application program 220 will be described. The controller 20 of the user device 12 performs a first drawing process, a designation process, a trial parts acquisition process, and a second drawing process. Further, the user device 12 performs a registered parts display process and a mode switching process. These processes may be performed by one arithmetic circuit or may be performed by a plurality of arithmetic circuits in a distributed manner.

The first drawing process combines registered parts and outputs a video including an avatar object to the display 28. The video distribution method includes a client rendering method in which the viewing user device 12B in addition to the distributing user device 12A acquires the video configuration data necessary for generating the video and generates the video, a video distributing method in which the distributing user device 12A generates and encodes the video data and sends such to the viewing user device 12B, and a server distributing method in which the server generates and encodes the video and sends such to the distributing user device 12A and the viewing user device 12B. In this embodiment, a method of displaying a video on the user device 12 by the client rendering method will be described. It should be noted that the method may be a hybrid method in which the viewing user device 12B performs rendering of parts or the like and other image processing using the video data generated by the distributing user device 12A, or a method in which the server 13 generates the video, or another video distribution method. Further, the video distribution method may be a web distribution method in which the video data generated and encoded by the distributing user device 12A can be viewed on a web browser of the user device 12. In this case, the user device 12 does not have to store the video application program 220.

In the client rendering method, in the first drawing process, the controller 20 applies tracking data acquired from the sensor portion 24 to the avatar object in the distribution mode to generate an animation. Further, the controller 20 renders the avatar object and objects other than the avatar object. Rendering here refers to a drawing process including acquisition of the position of a virtual camera, perspective projection, hidden surface erasure (rasterization), and the like. Rendering may be at least one of these processes, and may include processes such as shading and texture mapping.

Further, the controller 20 generates an animation using the rendered image. Further, the controller 20 outputs to the display 28 video data in which the animation is combined with a posted message sent from the viewing user device 12B, a notification sent from the server 13, or the like. In the distribution mode, the controller 20 synchronizes audio data input from the microphone 26 with the video data and outputs the audio data from the speaker 25.

In the viewing mode, the controller 20 receives from the server 13 the part IDs of the main body parts and the attached parts of the avatar object used by another user 10 who distributes the video. Further, the controller 20 receives from the server 13 the tracking data and the audio data sent from the other distributing user device 12A. Then, the controller 20 applies the received tracking data to the avatar object corresponding to the other distributing user 10A to generate an animation. Further, the controller 20 outputs video data obtained by synthesizing the animation and the posted message, the notification, or the like, received from the server 13 to the display 28, and outputs the audio data from the speaker 25 in synchronization with the video data. Rendering in the viewing mode is similar to rendering in the distribution mode.

Further, in the distribution mode, the controller 20 performs a distribution process. In the distribution process, the part IDs of the main body parts and the attached parts of the avatar object that distributes the video are sent to the server 13. Further, the controller 20 sends the tracking data and the audio data to the server 13.

The designation process is a process of sending information for designating a lottery target group to the server 13 based on an operation by the user 10 to the operation portion 27. The trial parts acquisition process is a process of acquiring trial parts data 356 related to trial parts included in the lottery target group and storing them in the storage 22 as trial parts data 222.

The second drawing process is a process of outputting the avatar object to which the trial parts are automatically applied to the display 28 by using the trial parts data 222. In the following, automatically applying trial parts is referred to as an automatic trial. That is, a shirt or the like is automatically tried on the avatar object, or a wallpaper is automatically placed in the background of the avatar object.

A registered parts display process is a process of displaying the registered parts on the display 28 using the registered parts data 221 in response to an input operation of the user 10. A mode switching process is a process of switching between a distribution mode for distributing a video and a viewing mode for viewing a video according to an input operation of the user 10.

(Automatic Trial)

Figure 5:
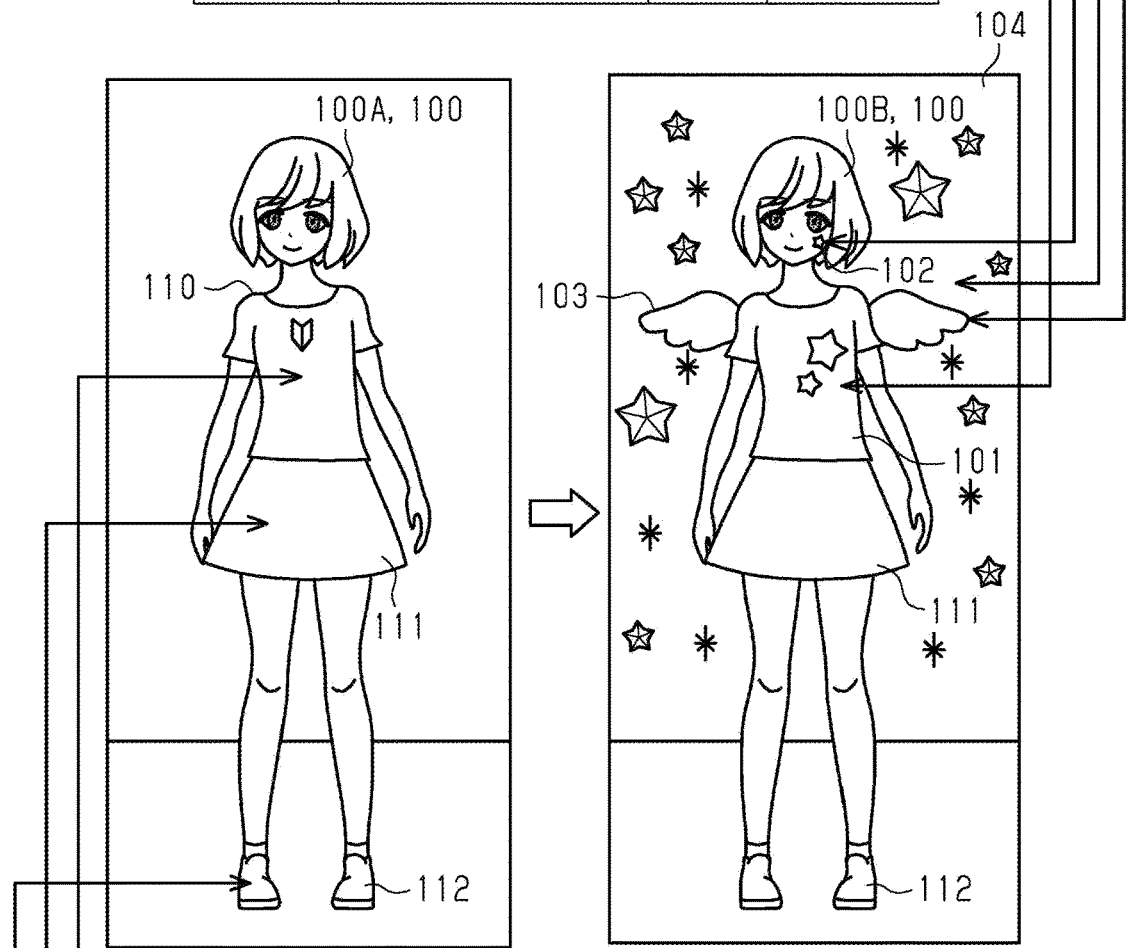
FIG. 5 is a schematic view showing an automatic trial process of the same embodiment.

An automatic trial will be described in detail with reference to FIG. 5. FIG. 5 shows an avatar object 100A before applying the trial parts and an avatar object 100B after applying the trial parts. Further, the avatar object 100A before the automatic trial has applied thereto the drawing data of the attached parts selected by the user 10 from among the attached parts that are the registered parts associated with the user 10.

When a condition for performing the automatic trial is satisfied, the user device 12 acquires the trial parts data 222. The condition for performing the automatic trial is, for example, that a lottery target group is designated by the user 10, that a button for performing the automatic trial is selected and operated while the lottery target group is designated, or the like. Then, the user device 12 selects drawing data corresponding to the part IDs included in the trial parts data 222 from the drawing data stored in advance in the storage 22. As shown in the avatar object 100B after the automatic trial in FIG. 5, the user device 12 applies the selected drawing data to the portion or area indicated by the attribute data. If another part has already been applied to the part or area to which the drawing data is applied, the application of that is canceled (or invalidated) and the selected drawing data is applied. That is, the user 10 does not apply the trial parts, but the trial parts are automatically applied when the condition for automatic trial is satisfied.

For example, the user device 12 cancels application of a shirt 110 worn by the avatar object 100A, and applies a shirt 101, which is a trial part, to the upper body of the avatar object 100B. Further, the user device 12 applies the drawing data of a face sticker 102 to the face of the avatar object 100B. Further, the user device 12 applies wings 103 to the back of the avatar object 100B, and applies a wallpaper 104 to the background of the avatar object 100B. As a result, the parts of the parts or regions to which the trial parts are not applied are maintained as applied to the avatar object 100A before the automatic trial. In the example of FIG. 5, a skirt 111 and sneakers 112, which were applied before the automatic trial, are maintained even after the automatic attachment.

In this way, by making it possible to combine the parts possessed by the user 10 with the parts that may be acquired by lottery, the user 10 can confirm compatibility with the parts possessed by the user 10. After the first automatic attachment, the user 10 can reselect any part from the parts possessed by the user 10 if the desire is to combine these with other parts possessed by the user. If the parts possessed and the parts that may be acquired by lottery are compatible with each other, the user 10 will be more motivated to participate in the lottery.

The provider can increase the motivation of the user 10 to participate in the lottery by automatically trying high-value trial parts or by automatically trying a plurality of trial parts that have a synergistic effect by combining them. For example, the provider can include, in the trial parts, parts with a high rarity (rareness) or parts with a low lottery probability. In other words, parts with a high rarity and parts with a low lottery probability often require many man-hours to manufacture and have high value, for example the depiction of the parts is detailed, bones are incorporated in the parts and movements such as shaking according to the movement of the avatar object are performed. Furthermore, by combining trial parts that are compatible with each other, it is possible to enhance aesthetics and a sense of unity. In addition, wallpaper has a larger display area than parts such as clothes, and has a high value because it greatly affects the appearance and atmosphere of the distribution space. For this reason, it is preferable to include wallpaper in the trial parts. By letting the user 10 experience such high-value trial parts, it is anticipated that the user 10 will be interested in the lottery.

(Server Processing)

Next, processing executed by the server 13 executing the distribution program 355 will be described. The controller 30 performs a parts sending process, a designation receiving process, a trial parts sending process, a lottery request receiving process, a lottery execution process, and a lottery data sending process. These processes may be performed by one arithmetic circuit or may be performed by a plurality of arithmetic circuits in a distributed manner.

The parts sending process is a process of sending drawing data for drawing parts applied to an avatar object to the user device 12. The designation receiving process is a process of receiving information from the user device 12 that designates a lottery target group including a plurality of lottery target parts.

The trial parts sending process is a process of sending the trial parts data 356 to the user device 12 at a predetermined timing. The lottery request receiving process is a process of receiving, from the user device 12, a lottery execution request from the lottery target group.

The lottery execution process is a process of selecting by lottery a predetermined number of parts from the lottery target group designated by the user 10. The lottery data sending process is a process of sending data related to lottery parts selected by lottery from the lottery target group to the user device 12.

Further, the controller 30 performs a video distribution process. Specifically, the controller 30 sends a list of videos being distributed in response to a request from the viewing user device 12B. The controller 30 receives the identification information of a video selected from the list from the viewing user device 12B. Further, the controller 30 sends, to the viewing user device 12B, tracking data or the like acquired from the distributing user device 12A that distributes the selected video. Further, the controller 30 receives a posted message or the like posted by the viewing user for the video being delivered. Further, the controller 30 sends the received posted message to the distributing user device 12A and the viewing user device 12B. In addition to the content of the message, the posted message includes identification information (the account name of the user 10 and the like) of the viewing user 10B, posting date and time, and the like. In addition, the message displayed in the video also includes a notification message of "User A has entered the room".

In addition, the controller 30 performs a gift display process. Specifically, the viewing user device 12B receives a request for displaying a gift object for the video being viewed. The gift object for which the display request is made is an object displayed in the virtual space, and includes a gift object provided by the viewing user 10B to the distributing user 10A that distributes the video, an evaluation object that favorably evaluates the video, or the like. The gift object may be one for which a display request can be made without making a payment, or one for which a display request is made by making a payment. Alternatively, the gift object may be one for which a payment is made when a display is made in response to the display request. The controller 30 sends a display request for the gift object together with the identification information of the gift object to the distributing user device 12A and the viewing user device 12B. When the display request for the gift object is received by the server 13, or when a predetermined operation is performed by the distributing user 10A for the gift object, the server 13 sends to the distributing user device 12A and the viewing user device 12B a notification message such as "User B provided fireworks".

In addition, the controller 30 performs a purchase process. Specifically, in accordance with an operation of the user 10, a purchase process of an arbitrary part designated by the user 10 and a purchase process of a lottery are performed. The purchase process includes a process of paying a price (medium) of coins, points, tickets, or the like, that can be used in the video application program. For example, points can be obtained by distributing a video and watching a video. In addition, the purchase process may include the process of exchanging, selling, or transferring parts. The purchase process stores the purchased parts as registered parts in at least one of the user device 12 and the server 13 in association with the user 10. Earnings from parts that can be purchased are distributed, for example, to distributing users 10A and service providers.

(Operation)

A procedure for performing an automatic trial will be described by taking as an example a case where the distributing user device 12A distributes a video, with reference to FIG. 6.

The distributing user device 12A and the viewing user device 12B acquire necessary data from the server 13 from among the registered parts data 351 and the lottery data 353 at a predetermined timing such as when the application is started or when the avatar object 100 is called to the screen. The data acquired by the distributing user device 12A and the viewing user device 12B from the server 13 is data that may be displayed in the application, not data specified by the user 10. The user devices 12 may appropriately request from the server 13 the data necessary for drawing a video or the like, and may acquire the designated data from the server 13.

The distributing user device 12A that has transitioned to a distribution mode based on an operation of the distributing user 10A outputs to the display 28 a video in which tracking data generated by the sensor portion 24 is applied to the avatar object 100 selected by the distributing user 10A. In addition, the distributing user device 12A generates video configuration data for generating a video. The video configuration data includes tracking data of operations by the distributing user 10A that have been detected. Then, the generated video configuration data and audio data are sent to the server 13 (step S1). The part IDs of the parts for drawing the avatar object corresponding to the distributing user 10A may be included in the video configuration data, or may be sent at a timing different from transmission of the video configuration data.

The viewing user device 12B, which has transitioned to a viewing mode based on an operation of the viewing user 10B, receives a list of distributed video channels from the server 13 and outputs the list to the display 28. The viewing user 10B performs an operation on the operation portion 27 to select a video to be viewed from the list. The viewing user device 12B sends a display request for the selected video together with the identification information (ID) of the selected video (step S2).

The server 13 sends the audio data and the video configuration data for drawing the video corresponding to the display request to the viewing user device 12B (step S3). Upon receiving the video configuration data and the audio data, the viewing user device 12B configures the avatar object 100 by using the part ID of the avatar object corresponding to the distributing user 10A. Further, tracking data is applied to this avatar object to generate an animation of the avatar object and output it to the display 28. Further, the audio data is output from the speaker 25 in synchronization with the video. In FIG. 6, the video output control process on the display 28 in the distributing user device 12A and the video output control process on the display 28 in the viewing user device 12B are omitted for convenience.

When the distributing user 10A performs a lottery during distribution of the video, the distributing user 10A operates the operation portion 27 to transition to a lottery list screen. Further, the distributing user 10A selects an arbitrary lottery on the lottery list screen. The distributing user device 12A sends a lottery ID designating a lottery target group corresponding to the selected lottery to the server 13 (step S4). The server 13 reads the trial parts data 356 corresponding to the received lottery ID from the storage 35, and sends the read trial parts data 356 to the distributing user device 12A (step S5).

The distributing user device 12A stores the received trial parts data 356 in the storage 22 as trial parts data 222 corresponding to the designated lottery target group. Then, the distributing user device 12A performs an automatic trial using the trial parts data 222 (step S7). Specifically, the distributing user device 12A acquires drawing data corresponding to the part ID included in the trial parts data 356 from among the drawing data of the lottery target parts stored in advance in the storage 22. Further, the distributing user device 12A applies the drawing data to the part or area of the avatar object 100 indicated by the attribute data associated with the acquired drawing data.

Further, the server 13 sends the trial parts data 356 to the viewing user device 12B (step S6). Similar to the distributing user device 12A, the viewing user device 12B applies the trial parts to a part of the avatar object 100 corresponding to the distributing user 10A or a predetermined area of the virtual space, and performs an automatic trial process (step S8). In this way, when the distributing user 10A performs an automatic trial during video distribution, the viewing user 10B can also confirm the situation on the video. At this time, the viewing user 10B can perform an input operation to the operation portion 27 and send his/her impression of the automatic trial to the distributing user 10A as a message.

The distributing user 10A visually recognizes the result of the automatic trial on the screen. Then, when the lottery is performed, the distributing user 10A performs an input operation for executing the lottery on the operation portion 27. As a result, a lottery confirmation screen is displayed on the distributing user device 12A. For example, this lottery confirmation screen includes a selection button for selecting a type such as coins or points associated with the distributing user 10A, coins or points that are payment for the lottery, a purchase button for purchasing coins, and the like. This lottery confirmation screen is not displayed on the viewing user device 12B. When a selection portion such as a lottery execution button is operated, the distributing user device 12A performs a lottery request process of sending a lottery execution request to the server 13 (step S9). At this time, the lottery ID may be included in the lottery execution request. Upon receiving the lottery execution request, the server 13 executes the lottery with the lottery target group corresponding to the lottery ID sent from the user device 12 as the population (step S10).

At this time, the server 13 performs a purchase process that requests payment for the lottery. In the purchase process, the payment for the lottery is reflected in the user management data 350. For example, when one lottery consumes "100 C" of coins or "100 P" of points, "100 C" is subtracted from the number of coins included in the user management data 350, or "100 P" is subtracted from the number of points included in the user management data 350. The type of payment to be consumed can be specified by the distributing user 10A. Alternatively, the server 13 may send the payment for the lottery and the request for executing the purchase process to another settlement server.

The server 13 sends the part ID, which is the identification information of the lottery part, which is the part for which the lottery is performed, to the distributing user device 12A (step S11). In this embodiment, the part ID is lottery parts data, but the lottery parts data may be drawing data for drawing the lottery part. The distributing user device 12A performs a lottery data receiving process of receiving the part ID. Then, the drawing data corresponding to the received part ID is acquired from the storage 22, and an image of the lottery part is output to the display 28. At this time, the lottery part may be displayed alone, or the lottery part may be displayed in the part or area of the avatar object 100 associated with the lottery part. Further, the server 13 stores the part ID of the lottery part as a registered part in the registered parts data 351 (step S12). Further, the distributing user device 12A stores the part ID of the lottery part in the registered parts data 221 as a part possessed by the distributing user 10A (step S13).

Further, the server 13 sends the part ID of the lottery part to the viewing user device 12B (step S14). Similar to the distributing user device 12A, the viewing user device 12B acquires drawing data corresponding to the received part ID from the storage 22 and outputs an image of the lottery part to the display 28. At this time, the lottery part may be displayed alone, or the lottery part may be displayed in the part or area of the avatar object 100 associated with the lottery part. The lottery part may be displayed only on the distributing user device 12A and need not be displayed on the viewing user device 12B.

An automatic trial can be performed even if a video is not distributed. Of the steps described above, the processes executed by the server 13 with respect the viewing user device 12B and the processes performed by the viewing user device 12B are omitted.

Figure 7:
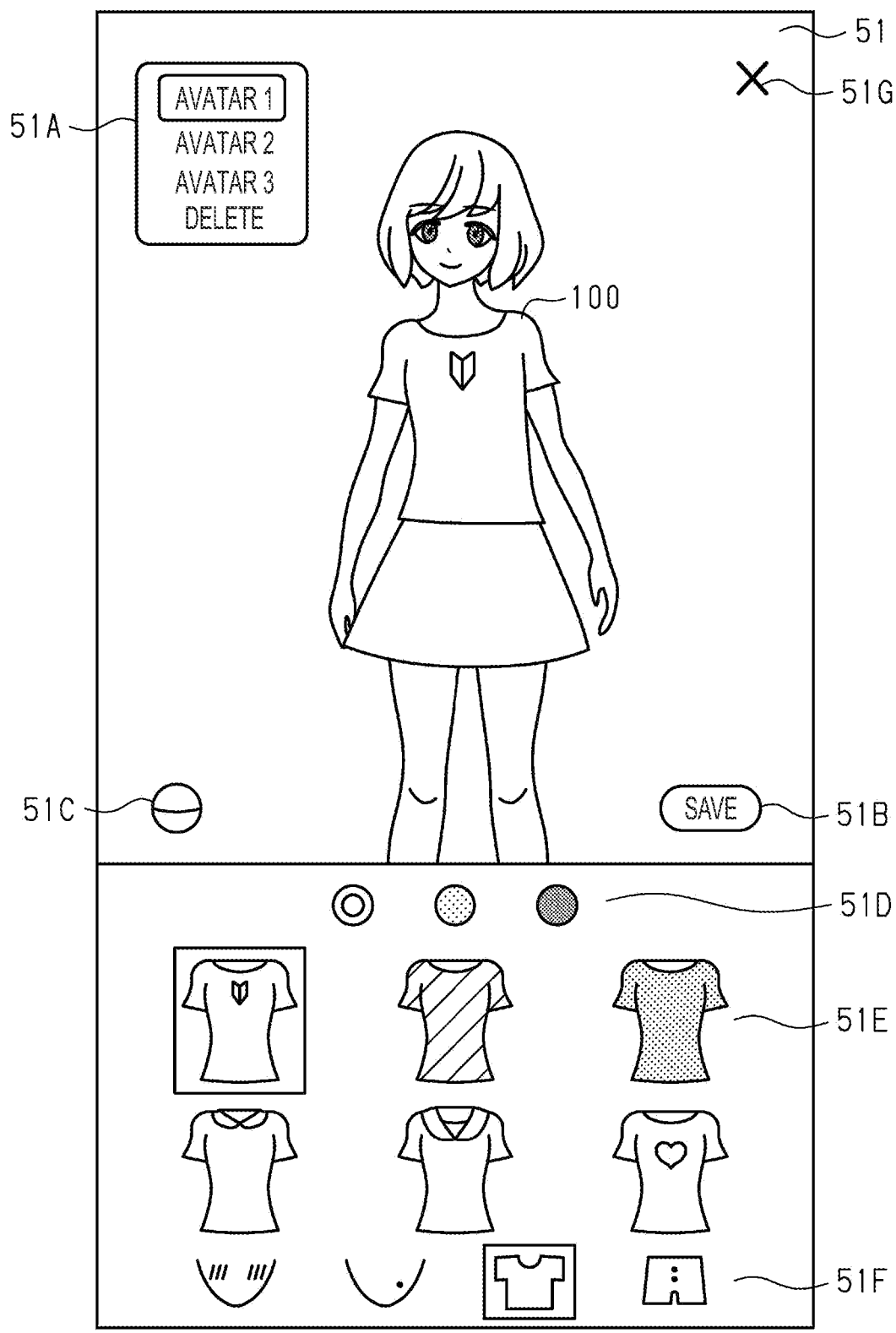
FIG. 7 is a screen view of a closet mode in the same embodiment.

Screens displayed on the distributing user device 12A or the viewing user device 12B will be described with reference to FIG. 7 to FIG. 11. FIG. 7 is a closet screen 51 displayed on a user device 12. The closet screen 51 is displayed in closet mode, which is a mode other than the distribution mode and the viewing mode. In the closet mode, the registered parts that can be used by the user 10 are included in the screen and displayed, and the user 10 can select the registered parts and apply the registered parts to the avatar object 100. That is, in this mode, the user 10 can prepare for distribution. While the video is being distributed, when the closet screen 51 is displayed on the distributing user device 12A, the closet screen is not displayed on the viewing user device 12B. In this embodiment, the closet screen is displayed when the automatic trial is performed even during video distribution.

The closet screen 51 includes the avatar object 100, an avatar selector 51A, a save button 51B, a lottery button 51C, a color selector 51D, a registered parts list 51E, and a category selector 51F. The avatar selector 51A displays a list of selectable avatars. For example, when the user 10 selects "Avatar 1", the user device 12 refers to the main body data corresponding to "Avatar 1" in the registered parts data 221 and acquires the part IDs of the main body parts. Further, the drawing data of the parts corresponding to the acquired part IDs are acquired from the storage 22, and the avatar object 100 is displayed on the display 28. Further, when "Avatar 2" is selected, another avatar object 100 corresponding to "Avatar 2" is displayed.

The category selector 51F displays icons of parts categories. When a category of the category selector 51F is selected by the user 10, the registered parts corresponding to the selected category are displayed in the registered parts list 51E. When a part displayed in the registered parts list 51E is selected by the user 10, the user device 12 displays the selected part in the part or area of the avatar object 100 indicated by the attribute data associated with the part. Further, the color selector 51D displays color sample icons such as "black", "yellow", "orange", "red", and "pink". When a color sample icon is selected, the color of the part changes. The number of color samples varies depending on the part. The save button 51B is a button for saving the avatar object to which the registered parts are applied. When the save button 51B is selected, the user device 12 registers the combination of the registered parts in the registered parts data 221. Further, the user device 12 sends a part ID indicating the combination of parts to the server 13 together with the identification information of the avatar object. The server 13 associates the received part ID with the identification information of the avatar object and stores it in the storage 35. The lottery button 51C is a button for displaying a lottery list screen. When a mode end portion 51G is selected, the closet mode ends.

Figure 8:
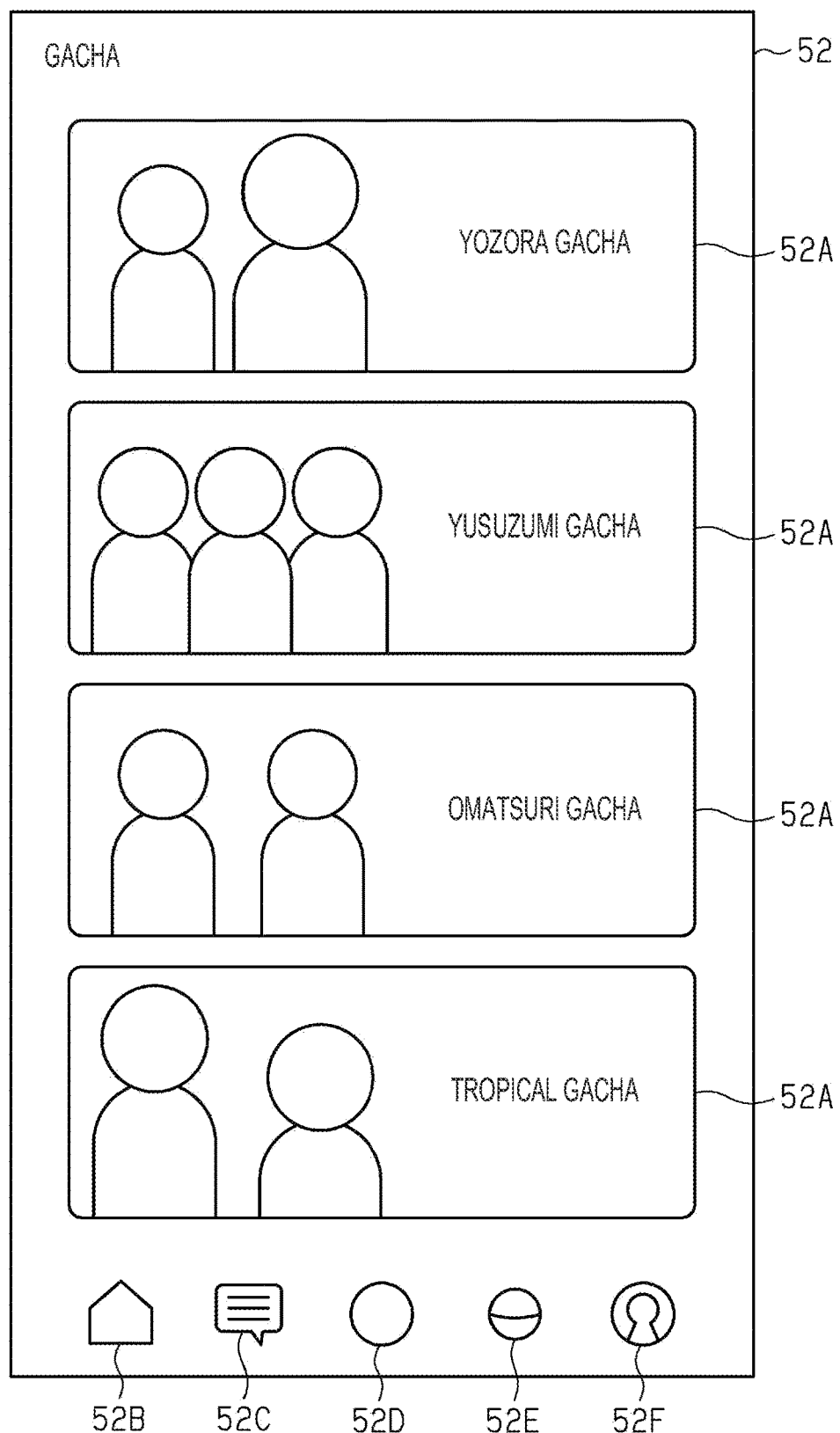
FIG. 8 is a diagram showing a lottery list screen in the same embodiment.

FIG. 8 is a lottery list screen 52 displayed on the user device 12. On the lottery list screen 52, banners 52A for selecting the type of lottery are displayed. The distributing user 10A performs an operation of selecting a banner 52A. When the banner 52A is selected, the distributing user device 12A sends the lottery ID to the server 13. A home button 52B for returning to the home screen, a notification display button 52C for displaying notifications, a distribution button 52D for distribution, a lottery button 52E for performing a lottery, and an edit button 52F for editing profile information and the like are displayed on the lottery list screen 52. When the lottery button 52E is selected on the home screen, the screen transitions to the lottery list screen 52. On the lottery list screen 52, even if the lottery button 52E is selected, the screen does not change to another screen. Further, when the distribution button 52D is selected, a distribution standby screen (not shown) is displayed. From the distribution standby screen, it is possible to transition to the closet screen 51 or a distribution screen.

Figure 9:
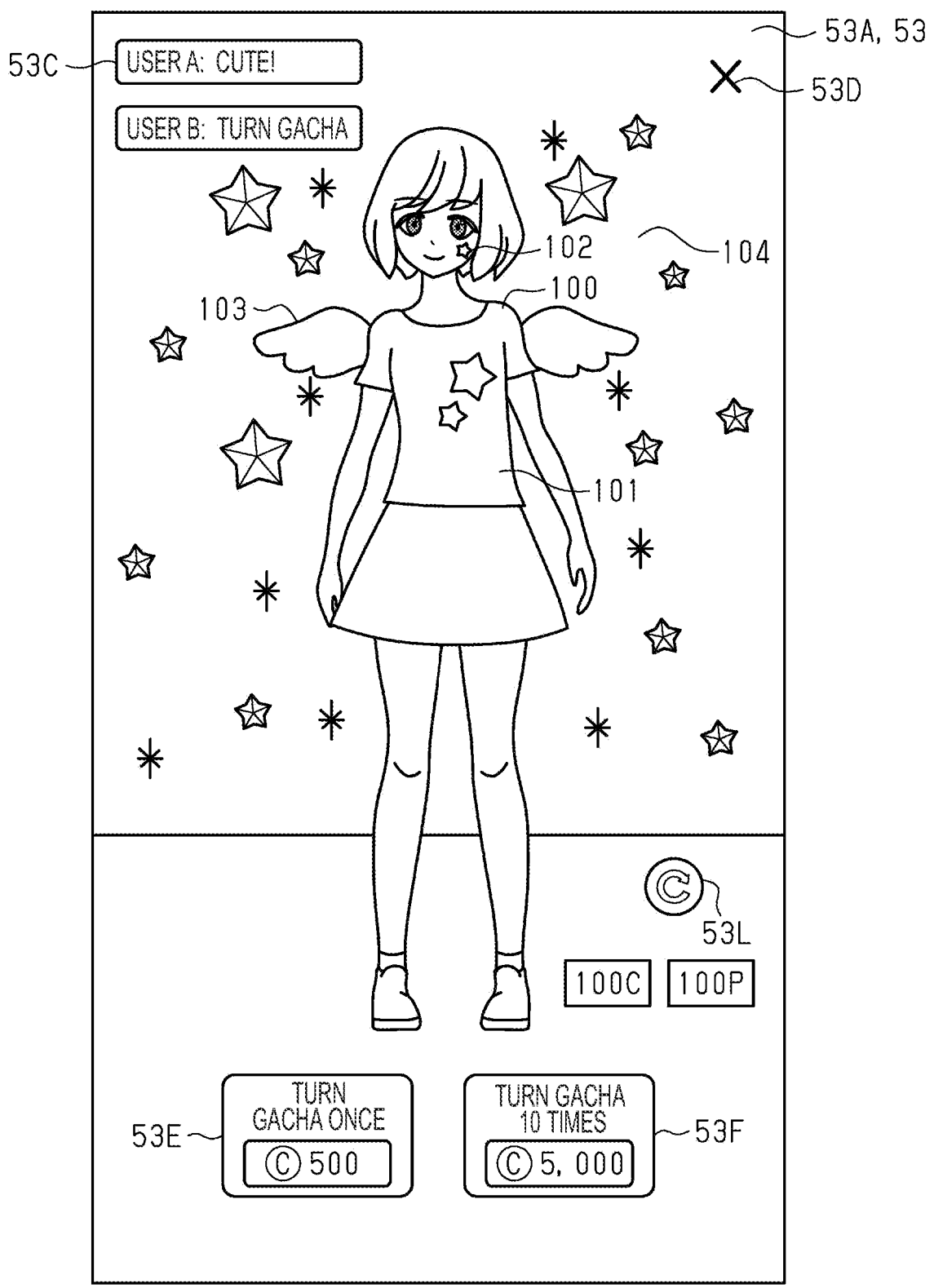
FIG. 9 is a diagram showing an example of an automatic trial screen of the same embodiment.

FIG. 9 shows an example of an automatic trial screen 53 displayed on the distributing user device 12A. This automatic trial screen 53A is a screen for when an automatic trial is performed during video distribution. The automatic trial screen 53A includes the avatar object 100, a message display 53C, a mode end portion 53D, lottery execution buttons 53E and 53F, and a reset button 53L. A shirt 101, a face sticker 102, wings 103, and wallpaper 104, which are trial parts, are applied to the avatar object 100.

The message display portion 53C is a message sent from the viewing user device 12B. The message display 53C is not displayed when the video is not delivered. The lottery execution buttons 53E and 53F are buttons for executing a lottery, and are provided, for example, according to the frequency of and payment for the lottery. When any of these is selected, a lottery execution request is sent from the user device 12 to the server 13. When the mode end portion 53D is selected, the user device 12 closes the automatic trial screen 53A. Further, a screen that is the same as the automatic trial screen 53A is displayed on the viewing user device 12B. On the automatic trial screen 53A displayed on the viewing user device 12B, the lottery execution buttons 53E, 53F and the like may be hidden. By being selected, the reset button 53L resets the applied parts. When the applied parts are reset, the avatar object becomes the avatar object 100 to which the parts set in the closet mode have been applied.

Figure 10:
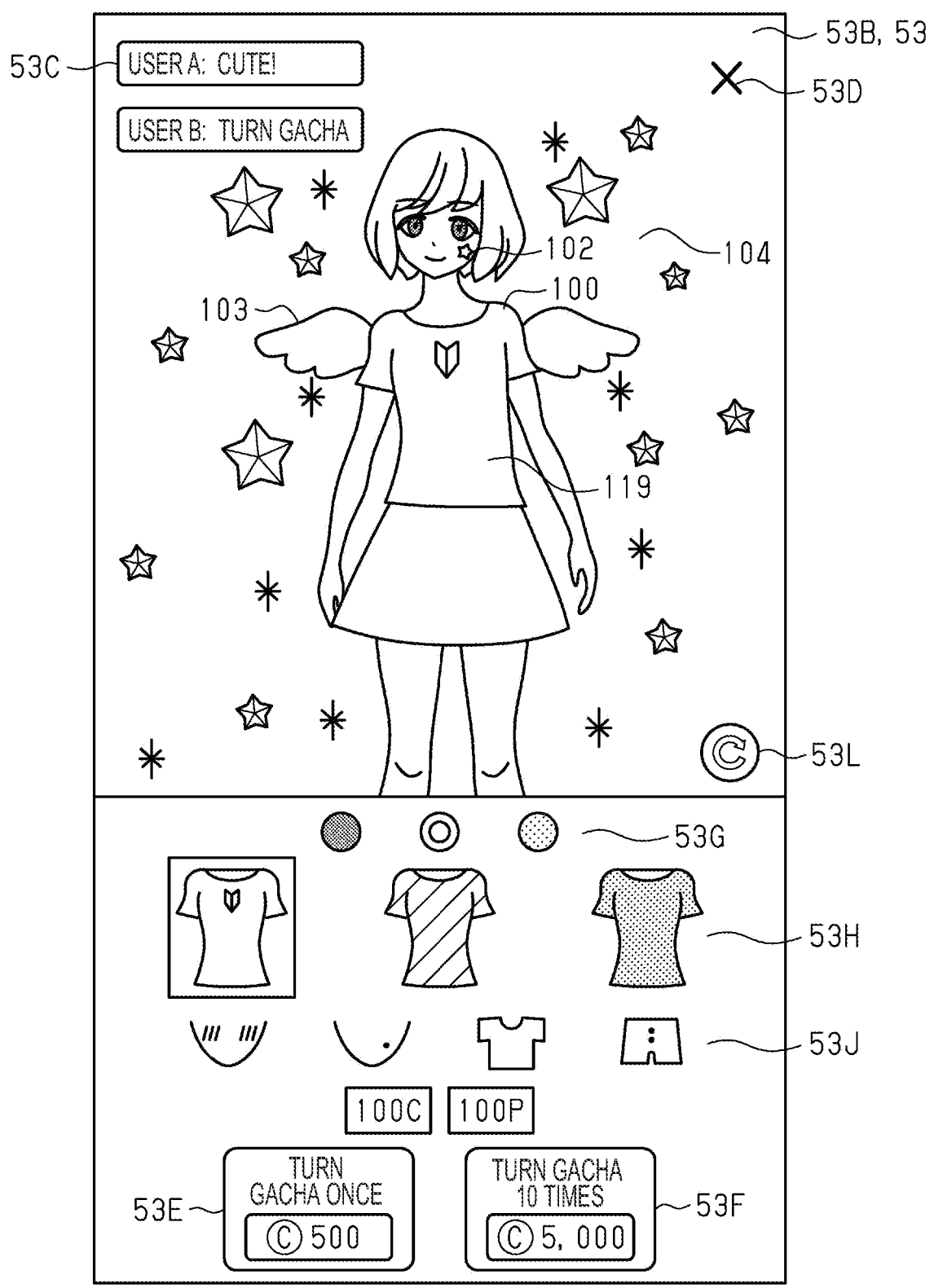
FIG. 10 is a diagram showing another example of an automatic trial screen of the same embodiment.

FIG. 10 is another example of the automatic trial screen 53. On automatic trial screen 53B, after displaying the avatar object 100 for which the automatic trial has been performed, the trial parts can be changed by a selection by the distributing user 10A. The automatic trial screen 53B includes the avatar object 100, the message display 53C, the mode end portion 53D, the lottery execution buttons 53E and 53F, a color selector 53G, a parts selector 53H, a category selector 53J, and the reset button 53L. The category selector 53J displays the categories included in the lottery target group. Parts are displayed on the parts selector 53H in the same manner as the registered parts list 51E of the closet screen 51. These parts are ones included in the lottery target group. The color selector 53G displays color samples in the same manner as the color selector 51D of the closet screen 51.

Alternatively, the categories to which the registered parts of the user 10 belong may be displayed in the category selector 53J, and the registered parts may be displayed in the parts selector 53H. When the user 10 selects a registered part, the trial part and the registered part selected by the user 10 can be combined. Therefore, the user 10 can confirm compatibility between parts on hand and parts that may be won by lottery.

Instead of the trial parts, the reset button 53L may be selected when applying the lottery target parts or registered parts to the avatar object 100. As a result, the avatar object 100 is changed to the avatar object 100 to which the parts set in the closet mode were applied. Therefore, the user 10 can select the lottery target parts or the registered parts displayed on the parts selector 53H one by one, and can reduce the time and effort of changing parts.

The parts targeted for automatic trial are applied to the avatar object 100. When a part is selected by the parts selector 53H, the selected part is applied instead of the automatically tried part. For example, when a shirt is selected by the parts selector 53H, the selected shirt 119 is displayed instead of the automatically tried shirt 101. When a color sample icon is selected by the color selector 53G, the color can be selected. At this time, by selecting the reset button 53L, the parts applied to the avatar object 100 are reset, and the avatar returns to the state of the avatar object 100 on the closet screen 51. Specifically, the user device 12 refers to the identification information of the avatar associated with the attached parts data 351B and the non-attached parts data 351C, and acquires the attached parts and the non-attached parts stored in association with the avatar object 100 displayed on the screen. The attached parts and non-attached parts acquired at this time are parts of the initial state saved as being attached to the avatar object 100 in the closet mode.

When the reset button 53L is selected, if the section to which the trial part is applied is associated with a part in the closet mode, the association between the section and the part such as the trial part is released. Also, when the reset button 53L is selected, if "hat" is associated with the head of the avatar object 100 as a trial part but "hat" is not applied in the closet mode, the "hat" trial part will not be displayed. Also, when the reset button 53L is selected, if a part applied in the closet mode is associated with a section to which the trial part is not applied, the part applied in the closet mode is displayed. This is not limited to the trial parts, for when the reset button 53L is selected, the avatar object 100 returns to the state in the closet mode. That is, even if parts selected by the user 10 are applied to the avatar object 100 on the screen, the association of those parts is released, and the avatar returns to the initial state in which the parts were associated as ones attached to each section of the avatar object 100 by selecting the save button 51B.

A viewing screen displayed on the viewing user device 12B will be described with reference to FIG. 11. On a home screen 54, video selectors 54A showing videos that can be viewed are displayed. When the user selects a video selector 54A, the ID of the selected video is sent to the server 13 together with a display request. As a result, the user device 12 is placed in the viewing mode. When the distributing user performs an automatic trial during distribution of the video, an automatic trial screen 55 is displayed on the viewing user device 12B. The automatic trial screen 55 includes a message display 55A, a message input portion 55B, and an evaluation button 55C. Further, the automatic trial screen 53 may include a collaboration request button 55D for requesting the distributing user 10A to participate in collaborative distribution, and a gift display button 55E for displaying a gift object in the video. On this screen, the viewing user 10B can input their impression of the automatic trial into the message input portion 55B and send a message to the distributing user device 12A via the server 13. Further, the viewing user 10B can display an index showing a favorable evaluation on the video by selecting the evaluation button 55C.

In a state in which the trial parts are applied to the avatar object 100 and the automatic trial screen 55 is displayed on the viewing user device 12B, the display of the avatar object 100 to which the trial parts are applied may be restricted. For example, the display period of the avatar object 100 to which the trial parts are applied may be limited. Alternatively, restrictions may be set on the screen elements constituting the automatic trial screen 55. For example, at least one out of the message display 53C displayed on the distributing user device 12A and the message display 55A displayed on the viewing user device 12B may be hidden. Alternatively, the automatic trial screen 55 may display a stationary avatar object 100 instead of an avatar object 100 to which the tracking data is applied. Alternatively, a still image that captures a part of the automatic trial screen 53 may be displayed. By doing so, since it is difficult to continue the distribution of the video with the lottery not performed and the automatic trial screen 53 remaining, it is possible to suppress unintended use of the trial parts.

Next, effects of the first embodiment will be described.

(1-1) From the lottery target group designated based on the operation of the user 10, trial parts are automatically applied to the avatar object 100 based on the preset trial parts data 222. That is, the trial parts are automatically applied to the avatar object 100 without going through the selection of the trial parts by the user 10. The user 10 can confirm the aesthetic appearance of the trial parts or the compatibility with the avatar object 100 by visually recognizing the avatar object 100 to which the trial parts are automatically applied on the automatic trial screen 53. In addition, when a plurality of trial parts is applied, it is possible to confirm the compatibility of the trial parts. Therefore, it is possible to increase the motivation of the user 10 for the lottery and increase opportunities for drawing the parts applied to the avatar object 100. Further, as compared with the case where the trial parts are selected by the user 10 and applied to the avatar object 100, the time and effort of the user 10 can be reduced. Further, when a plurality of trial parts is applied to the avatar object 100, the user device 12 performs image processing to draw these trial parts one time, so the processing burden on the user device 12 can be reduced.

(1-2) The lottery parts selected in the lottery are included in the registered parts list 51E, which displays the registered parts, as registered parts that are associated with the user 10 and can be used at any time by the user 10. Further, images of the trial parts are not displayed in the registered parts list 51E. That is, since the trial parts are not displayed on the closet screen 51 of the user 10, the user 10 can be made to recognize the trial parts as parts that may be won by lottery and not as registered parts that can be used by the user 10 at arbitrary timing.

(1-3) In the case of an automatic trial, if a registered part has already been applied to the section or area associated with a trial part, the application of the registered part is cancelled, and the trial part is newly applied. Therefore, by applying the trial part instead of the registered part, the user 10 can compare the avatar object 100 that has tried the registered part with the avatar object 100 that has tried the trial parts. Thus, the user 10 can be made to be interested in the trial parts.

(1-4) The user device 12 selects the part IDs of the trial parts corresponding to the avatar attribute of the avatar object 100 from the trial parts data 222, and applies the trial parts corresponding to the selected part IDs to the avatar object 100. Therefore, trial parts matching the avatar attributes can be applied to the avatar object 100. Hence, when the user 10 visually recognizes the avatar object 100 that has tried the trial parts that have good compatibility, the motivation of the user 10 to participate in a lottery is increased. In addition, by providing trial parts for each avatar attribute, it is possible to increase the variation of trial parts and enable various expressions.

(1-5) The user device 12 receives the lottery target parts in advance. Further, since the user device 12 receives the part IDs of the trial parts when applying the trial parts to the avatar object 100, the load applied to the user device 12 during the automatic trial is reduced, and the trial parts can be tried promptly.

(1-6) A plurality of trial parts is applied to the avatar object 100, and all of these trial parts belong to different categories. For this reason, it is possible to increase the user's interest in the lottery, by causing the combination of the trial parts to have good compatibility and uniformity with each other.

(1-7) When the user device 12 is in the distribution mode, the automatic trial screen 53, which is the first image in which the trial parts are applied to the avatar object 100, is displayed. Further, in the viewing mode, the user device 12 outputs the automatic trial screen 55 that is a second image to the display 28 when the lottery target group is selected by the distributing user who distributes the video being viewed. The automatic trial screen 55 includes the avatar object 100 to which the trial parts are applied, and the message input portion 55B for sending a message to the distributing user 10A. Therefore, even in the viewing mode, the avatar object to which the trial parts are applied can be visually recognized. In addition, since it is possible to input a message to the message input portion 55B regarding the application of the trial parts and convey impressions to the distributing user 10A, it is possible to create a topic and activate communication between the distributing user 10A and the viewing user 10B.

Second Embodiment

Next, a second embodiment of the video distribution system will be described. In the first embodiment, the viewing user 10B can confirm the automatic trial screen 55. Instead of this, the second embodiment differs from the first embodiment in that the automatic trial screen 53 is displayed on the distributing user device 12A and a second image other than this is displayed on the viewing user device 12B.

Figure 12:
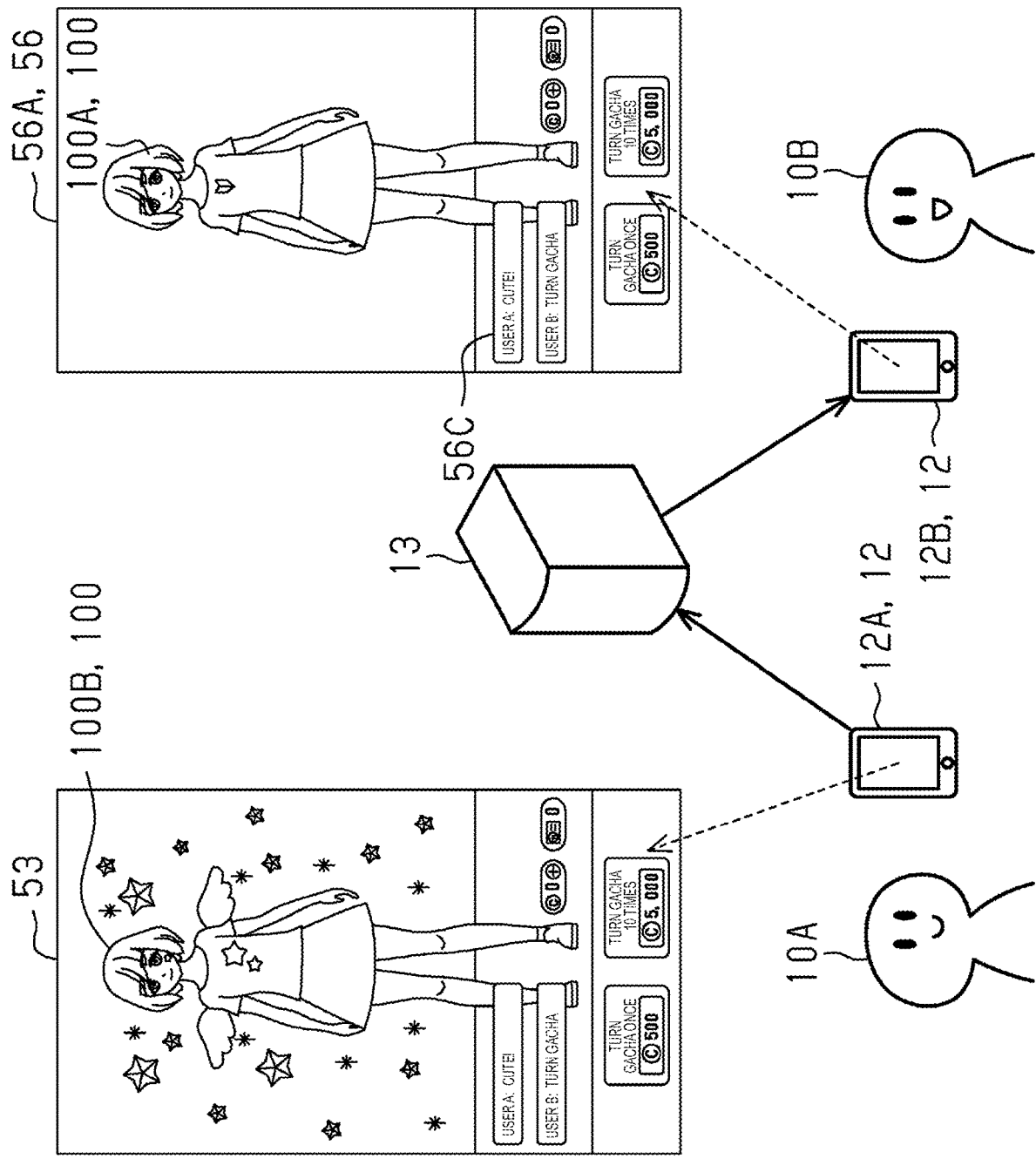
FIG. 12 is a diagram showing an example of an automatic trial screen and a viewing screen of a second embodiment.

FIG. 12 shows the automatic trial screen 53 displayed on the distributing user device 12A and a standby screen 56 displayed on the viewing user device 12B. When the distributing user device 12A sends the lottery ID to the server 13, the server 13 sends the trial parts data 356 corresponding to the lottery ID to the distributing user device 12A. Meanwhile, the server 13 sends a standby screen display request to the viewing user device 12B.

Upon receiving the trial parts data 356, the distributing user device 12A displays the automatic trial screen 53, which is the first image. The automatic trial screen 53 includes an image of the avatar object 100A to which the parts that are the target of automatic trial are applied. Meanwhile, when the viewing user device 12B receives the standby screen display request, the standby screen 56, which is a second image, is displayed on the display 28.

Figure 6:
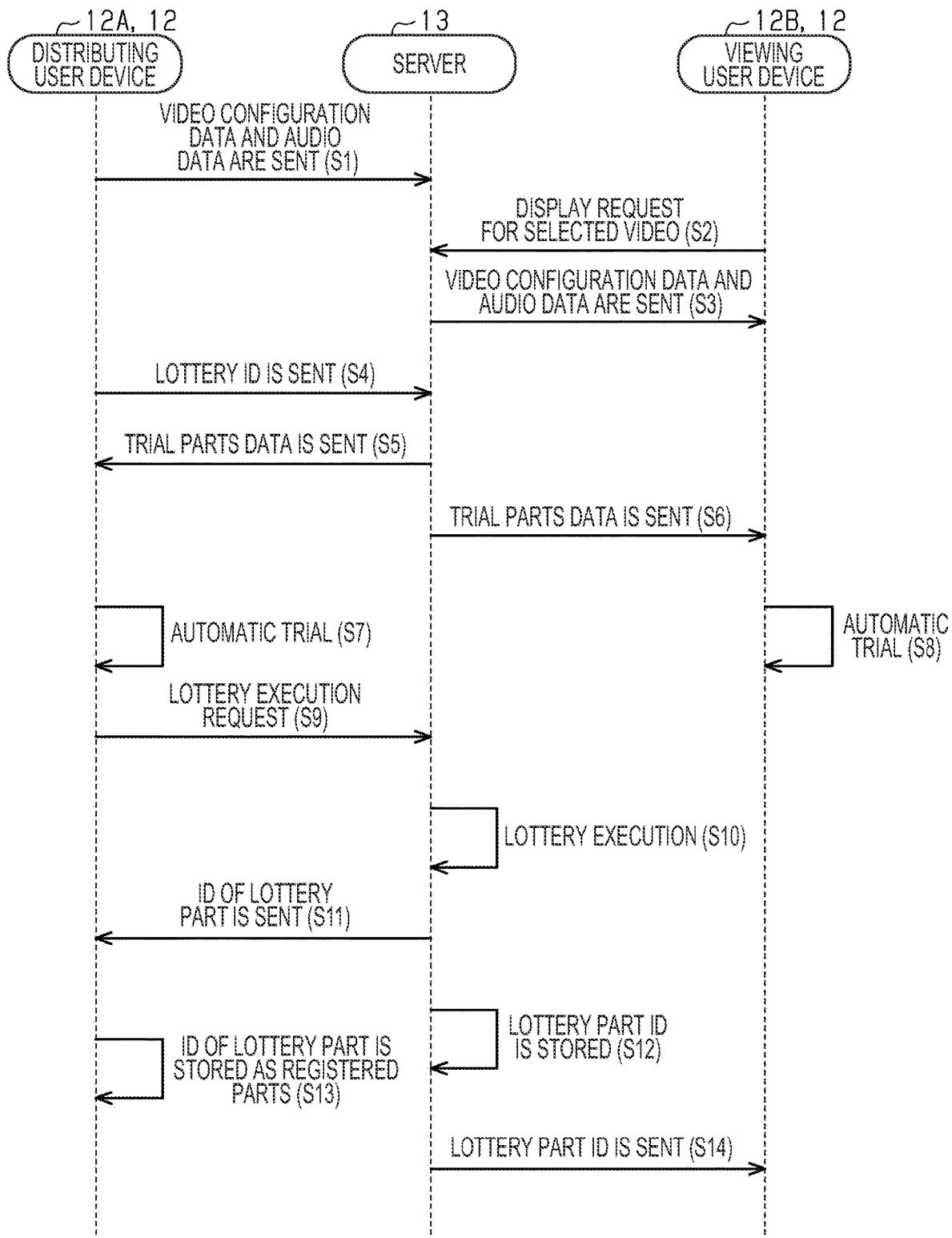
FIG. 6 is a sequence chart explaining the procedure of video distribution including the automatic trial process of the same embodiment.

In the second embodiment, the step (step S6) in which the server 13 sends the trial parts data 356 to the viewing user device 12B and the step (step S8) in which the viewing user device 12B performs an automatic trial using the trial parts data 356 are omitted from the automatic trial procedure of the first embodiment shown in FIG. 6. Instead of these steps, the server 13 sends standby data for displaying the standby screen on the viewing user device 12B to the viewing user device 12B. Further, the viewing user device 12B displays the standby screen on the display 28 based on the standby data. It is preferable for the standby data to include audio data based on the speech of the distributing user 10A, in addition to a standby screen output request. Further, the standby data may include tracking data of the distributing user 10A.

FIG. 12 shows an example of the standby screen 56 displayed on the viewing user device 12B. The configuration of the standby screen 56 is not particularly limited, but the avatar object 100B to which the trial parts are applied need not be displayed. The standby screen 56A shown in FIG. 12 includes an image of the avatar object 100B before the parts to be automatically tried are applied. That is, the distributing user device 12A displays the avatar object 100A to which the trial parts are applied, while the viewing user device 12B displays the avatar object 100B to which the trial parts are not applied. That is, the trial parts of the second embodiment are parts confirmed by the distributing user 10A but not confirmed by the viewing user 10B. Further, the automatic trial using the trial parts is visually recognized by the distributing user 10A but not by the viewing user 10B.

The tracking data included in the video configuration data may be applied to the avatar object 100B displayed on the standby screen 56. As a result, the avatar object 100B operates in accordance with the actions of the distributing user 10A. Further, the viewing user device 12B receives the audio data of the distributing user 10A and outputs the audio from the speaker 25. Further, the standby screen 56 may display the message display 56C sent from the viewing user device 12B.

Figure 13:
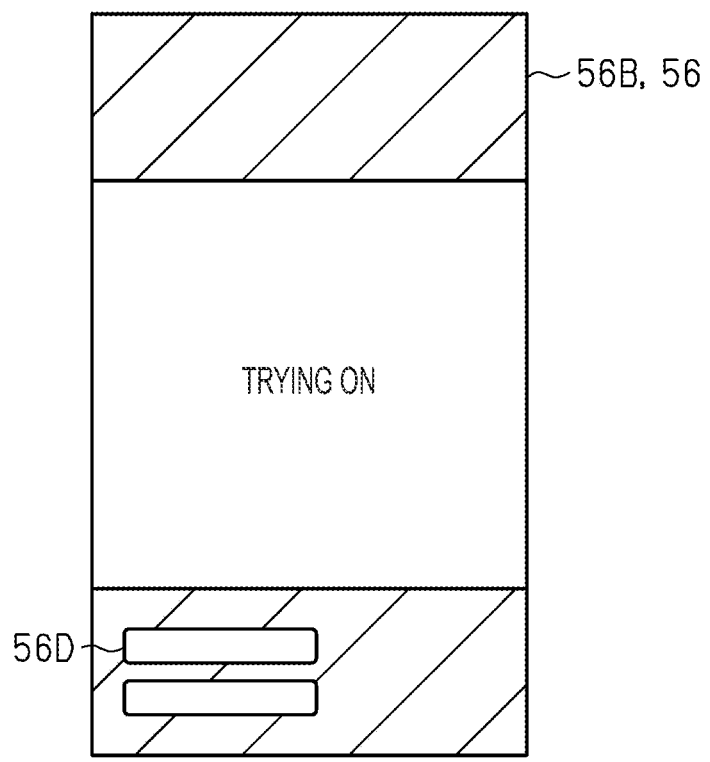
FIG. 13 is a diagram showing an example of a viewing screen of the same embodiment.

FIG. 13 shows a standby screen 56B, which is another example. The standby screen 56B is a screen that does not include the avatar object 100. A message indicating that the trial parts are being applied may be displayed on the standby screen 56B. A message 56D sent by the viewing user device 12B may be displayed on the standby screen 56B. Alternatively, as another example of the standby screen 56, the avatar object 100A to which the parts that are the target of the automatic trial are applied may be displayed with processing such as blurring or a reduction in resolution. Alternatively, only a part of the avatar object 100 to which the parts that are the target of the automatic trial are applied, or a portion of the parts for automatic trial, may be displayed on the standby screen 56. For example, the head of the avatar object 100 equipped with a "hat" as a trial part may be zoomed in to make a standby screen that does not include the upper body and the lower body. Alternatively, a smaller number of trial parts than the number of trial parts applied to the avatar object 100A may be applied to the avatar object 100B displayed on the standby screen 56. For example, only the wallpaper may be applied to the standby screen 56.

In the second embodiment, the following effects are exhibited in addition to the effects described in (1-1) to (1-6) of the first embodiment.

(2-1) When the user device 12 is in the distribution mode, the automatic trial screen 53, which is the first image in which the trial parts are applied to the avatar object 100, is displayed. Further, in the viewing mode, the user device 12 displays the standby screen 56, which is the second image, when the lottery target group is selected by the distributing user who distributes the video being viewed. The standby screen 56 does not include the avatar object 100 to which the trial parts are applied. Therefore, it is possible to suppress the distribution and viewing of the video while the trial parts are applied to the avatar object as if the trial parts were registered parts of the distributing user 10A. Therefore, it is possible to prevent the trial parts from being used in an unintended manner.

Third Embodiment

Next, a third embodiment of the video distribution system will be described. In the first embodiment, the distributing user 10A distributes the video independently. The third embodiment differs from the first embodiment in that a plurality of distributing users 10A perform collaborative distribution.

In collaborative distribution, a plurality of distributing users 10A displays their own avatar objects 100 in one video. In participating in collaborative distribution, a user device 12 sends a participation request to a distributing user device 12A via the server 13. When the distributing user approves the participation request, the distributing user 10A becomes a host user and the user who made the participation request becomes a guest user. The participation request may be made by a viewing user 10B who watches a video, or may be made by one user 10 to another user 10 before starting distribution of a video.

The server 13 receives video configuration data and audio data from a plurality of distributing user devices 12A participating in the collaborative distribution. The server 13 sends the received video configuration data and audio data to a distributing user device 12A other than the distributing user device 12A that sent them. Further, the server 13 sends the received video configuration data and audio data to the viewing user device 12B. The viewing user device 12B draws the avatar object 100 reflecting the actions of the distributing users 10A using the received video configuration data. Further, the viewing user device 12B outputs the received audio data from the speaker 25.

When either the host user or the guest user selects a lottery banner, the distributing user device 12A sends the lottery ID. The server 13 acquires the trial parts data 356 corresponding to the lottery ID, and sends the acquired trial parts data 356 to all the distributing user devices 12A and the viewing user devices 12B participating in the collaborative distribution.

When the distributing user devices 12A and the viewing user device(s) 12B receive the trial parts, they automatically perform a trial on all the avatar objects 100 participating in the collaborative distribution. Specifically, the distributing user devices 12A and the viewing user device(s) 12B acquire from the storage 22 the drawing data for the parts corresponding to the trial parts data 356 received from the server 13, and apply them to all the avatar objects 100. At this time, as in the first embodiment, the trial parts are applied based on the attribute data associated with each of the avatar objects 100.

Figure 14:
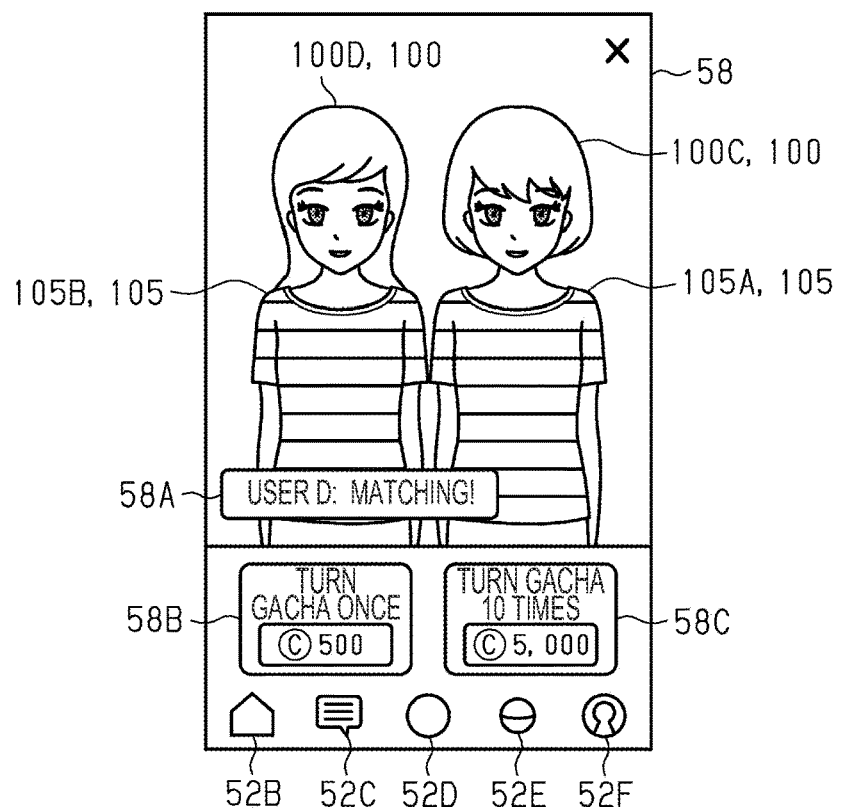
FIG. 14 is a diagram showing an example of a screen for collaborative distribution according to a third embodiment.

FIG. 14 shows an automatic trial screen 58 in collaborative distribution. The automatic trial screen 58 shown in FIG. 14 is a screen displayed on the distributing user device 12A. The automatic trial screen 58 includes a host user's avatar object 100C and a guest user's avatar object 100D. Trial parts 105 are applied to the avatar objects 100C and 100D. The trial parts 105 may have the same part ID. Further, the automatic trial screen 58 may include a message display 58A sent from the viewing user device 12B. For example, shirts 105A and 105B having the same pattern are applied to both the avatar objects 100C and 100D.

Alternatively, the server 13 may send the trial parts data 356 including the part IDs of different parts belonging to the same lottery target group to the distributing user device 12A participating in the collaborative distribution. For example, these are combinations of parts such as T-shirts with the same pattern but different colors, parts with different M-type and F-type models, and T-shirt parts and dress parts with the same pattern and color tone (theme). In this case, the server 13 sends the part IDs and the identification information of the avatar object associated with each part ID. The distributing user devices 12A and the viewing user device(s) 12B apply the trial parts to the avatar object 100 associated with the trial parts. Each of the avatar objects 100 is subject to the same lottery target group, but different trial parts 105 are applied.

Alternatively, the server 13 may send an emote function to the distributing user devices 12A participating in the collaborative distribution. The emote functions applied to each of the avatar objects 100 are simultaneously performed or linked. For example, by simultaneously moving the arms and hands of the two avatar objects 100 in accordance with the relative positional relationship of the avatar objects 100, a predetermined shape such as a heart or a circle is created. In this case, a component of each emote function is associated with the number of avatar objects 100 that execute the action and the relative positions of the avatar objects 100. Alternatively, a wave is created by continuously causing action by the three avatar objects 100. For example, when an operation to execute an emote function is performed by a predetermined user and an emote execution command is sent from a distributing user device 12A to the server 13, the server 13 sends an emote execution command to the other distributing user device 12A and the viewing user device 12B. Upon receiving the emote execution command, the user devices 12 output an animation that causes each of the avatar objects 100 to simultaneously perform an action corresponding to the emote function. Alternatively, upon receiving the emote execution command, the user device 12 outputs an animation that operates with a time lag to each of the avatar objects 100. In the emote function applied to each of the avatar objects 100, the order in which the animation is output and the elapsed time indicating the output timing are set. The animation of the second emote function is executed "0.5 second" after the animation of the first emote function is started. Further, the animation may be applied in order from the avatar object 100 arranged on the left side. As a result, the avatar objects 100 perform an interlocking action.

When the host user and the guest user like the trial parts, they operate the user devices 12 and select lottery execution portions 58B and 58C to send a lottery execution request to the server 13. The lottery execution request is sent together with the user ID and the like. Upon receiving the lottery execution request, the server 13 executes the lottery. Then, the part ID of the lottery part obtained as a result of the lottery is stored in the registered parts data 351 of the user(s) who sent the lottery execution request. Further, the server sends the part ID of the lottery part to the distributing user devices 12A and the viewing user device(s) 12B in association with the user ID of the user who sent the lottery execution request. The distributing user device(s) 12A of the user(s) who sent the lottery execution request stores the part ID of the lottery part in the registered parts data 221 based on the user ID. Further, the server 13 executes a purchase process for the user(s) 10 who sent the lottery execution request.

Similar to the first embodiment, in a mode in which trial parts are applied to a plurality of avatar objects 100 and the automatic trial screen 58 is displayed on the viewing user device 12B, the display of the avatar objects 100 to which the trial parts 105 are applied may be restricted. For example, only one avatar object 100 among the plurality of avatar objects 100 may be displayed with the trial parts applied, and the trial parts need not be applied to the other avatar objects 100. Alternatively, restrictions may be set on the screen elements constituting the automatic trial screen 58. By doing so, it is possible to prevent the lottery from being performed and the distribution being continued with the automatic trial screen 58.

In the third embodiment, the following effects are exhibited in addition to the effects described in (1-1) to (1-7) of the first embodiment.

(3-1) When a distributing user 10A participating in the collaborative distribution specifies the lottery target group, the same trial parts or different trial parts included in the same lottery target group are applied to all avatar objects. Therefore, it is possible to compare the compatibility with the trial parts among all the avatar objects participating in the collaborative distribution. Therefore, it is possible to activate communication between a plurality of distributing users 10A, and between the distributing users 10A and viewing user(s) 10B.

The above embodiments can be changed and implemented as follows. The above embodiments and the following modified examples can be implemented in combination with each other within a technically consistent range.

The display method of the standby screen 56 in the viewing user device 12B of the second embodiment may be applied to the collaborative distribution described in the third embodiment. In this case, for example, all the distributing user devices 12A participating in the collaborative distribution display the first image including the avatar object 100 to which the trial parts are applied. Alternatively, of all the distributing user devices 12A participating in the collaborative distribution, the first image including the avatar object 100 to which the trial parts are applied is displayed on the distributing user device 12A used by the distributing user 10A who designated the lottery target group. Further, the viewing user device(s) 12B viewing the collaborative distribution displays a second image that does not include the avatar object 100 to which the trial parts are applied.

In each of the above embodiments, the trial parts are main body parts, attached parts, and non-attached parts of the avatar object 100. Not only are the trial parts applied to the avatar object 100, but they may also exert a predetermined effect in the application. Further, in the case of collaborative distribution in which a plurality of users participates as in the third embodiment, combinations of trial parts may be applied one at a time to each of the avatar objects of the users participating in the collaborative distribution.

Figure 15:
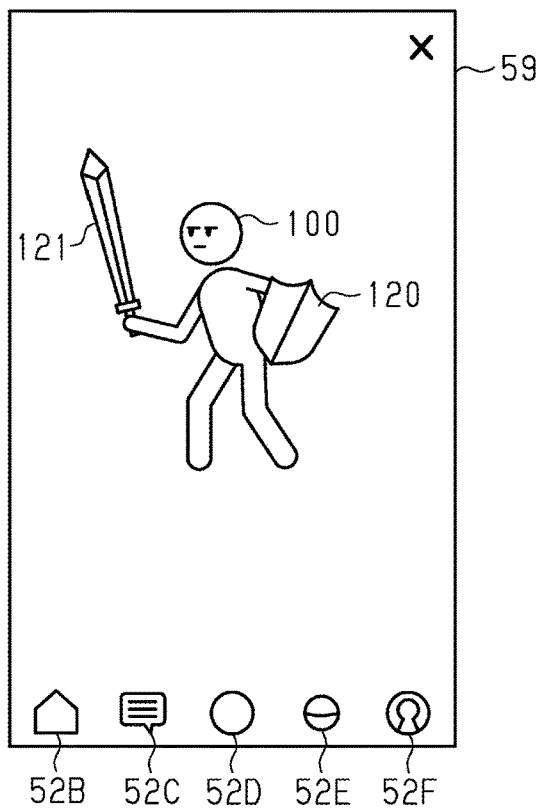
FIG. 15 is a diagram showing an example of an automatic trial screen of a modified example.

As illustrated on the distribution screen 59 shown in FIG. 15, the trial parts may be weapon parts 120 and 121 used by the avatar object 100. A distributing user 10A distributes a video of playing a game by using the avatar object 100. The avatar object 100 performs actions for clearing a mission set in the game. Actions are associated with trial parts. The actions affect objects such as another character, or an avatar object 100. The actions also reduce or increase, for example, parameters associated with objects or parameters associated with the avatar object. The values of the parameters change as the game progresses. The types of parameters are attack strength, defensive strength, combat strength, physical strength (hit points, stamina), magic power (magic points), level, experience value, skill points that are points consumed when using a skill, and agility of the avatar object 100 or other objects. The actions also move the other objects or the avatar object 100. The actions also increase or decrease, for example, the number of objects or the number of avatar objects. For example, the action of "attack" is associated with the "sword" weapon part 121. Further, an action effect is associated with this weapon part 121. The action effect is the magnitude of the influence or the magnitude of the effect given to the object, for example, "attack strength". In-game attributes may also be associated with the trial parts. The in-game attributes associated with the trial parts are, for example, a "fire attribute", a "water attribute", an "earth attribute", a "wind attribute", a "light attribute", and the like. Further, a combination of weapon parts having different attributes or compatible attributes, or a combination of different types of weapon parts having the same attributes may be applied one at a time to each of the avatar objects 100 displayed in the collaborative distribution. In this case, in a so-called guild battle in which a group consisting of multiple users competes, it is preferable to set a combination of weapon parts such as attack strength and defensive strength as a group to make it easier to win the battle as a group.

In such a game, the effect and size of the actions may differ depending on the combination of trial parts. For example, if trial parts having the same attributes are used, the effect of each of the trial parts will be greater. When the trial parts used by the avatar object 100 in the game are acquired in a lottery by one or more users in this way, a combination with high action effect or one with high in-game effect is distributed by the distributing user 10A, and through this it is possible to increase the motivation of the users 10A for the lottery. On the automatic trial screen 58, the avatar object(s) 100 equipped with the trial parts can execute an action. The number of trial parts to be acquired by lottery is not limited to a plurality, and may be a single number.

In each of the above embodiments, the lottery is performed without considering the overlap between the lottery parts and the registered parts associated with the user 10. That is, when the registered parts of the user 10 are included in the lottery target group, there is a possibility that the registered parts and the lottery parts will overlap when the user 10 performs the lottery. Therefore, when the server 13 receives the lottery execution request from the user device 12, the server 13 may exclude the registered parts of the user 10 who has sent the lottery execution request from the lottery target group. Specifically, when the server 13 receives the lottery execution request together with the user identification information from the user device 12, the server 13 acquires the registered parts data 351 corresponding to the user device 12 from the storage 35. Then, the lottery target data 354 corresponding to the registered parts data 351 is excluded from the lottery data 353. Thus, the lottery may be performed using the lottery data 353 excluding the lottery target data 354. Alternatively, the server 13 does not exclude the lottery target data 354 corresponding to the registered parts data 351 but determines whether or not the lottery parts are included in the registered parts data 351 when the lottery parts are determined. When the lottery parts are included in the registered parts data 351, the server 13 performs the lottery again. Then, the lottery is repeated until parts not included in the registered parts data 351 are drawn. By doing so, the registered parts and the lottery parts do not overlap, so the satisfaction level of the user 10 with respect to the lottery can be increased.

In each of the above embodiments, a guest user's avatar object is added to the video by requesting co-starring for the video delivered by the host user. Instead of this, a video in which an avatar object corresponding to a predetermined user co-stars may be distributed without determining a host user and a guest user.

In each of the above embodiments, an emote function has been described by exemplifying a device that operates a part such as a hand or an arm of an avatar object or a facial expression of an avatar object, but the present disclosure is not limited to this. The emote function may change the standing position of the avatar object, make the avatar object walk, or make the avatar object dance.

In each of the above embodiments, it is assumed that the video application program for viewing and distributing the video is installed in the user device 12. Instead of this, the application program for viewing the video and the application program for distributing the video may be separated into different application programs. When distributing, the video is distributed using the distribution application program. When viewing, the video is viewed using the viewing application program. A display request for a gift object is made by using the viewing application program.

(Video Distribution Method)

In each of the above embodiments, a client rendering method was used in which the distributing user device 12A and the viewing user device 12B receive video configuration data and the like to generate a video. Alternatively or additionally, a video distribution method in which the distributing user device 12A encodes video data may be used. In the video distribution method, the distributing user device 12A generates an animation using tracking data or the like and encodes the animation. Further, the distributing user device 12A sends the encoded data to the server 13. The server 13 sends the encoded data to the viewing user device 12B. At this time, the server 13 may send a message or audio data from the viewing user to the viewing user device 12B and the distributing user device 12A together with the animation. Further, the distributing user device 12A displays the animation using the tracking data. The viewing user device 12B decodes the encoded data and displays the animation. When a server distribution method is used as the video distribution method, the distributing user device 12A sends the video configuration data and the audio data to the server 13. The server 13 generates a video using the video configuration data and the audio data, encodes the video, and sends the video to the viewing user device 12B. At this time, the distributing user device 12A may generate a video based on the video configuration data or the like, or may receive the video data encoded from the server 13 and decode it to display the video.

(Video Distribution System)

The sensor portion 24 is made to acquire detection data that detects changes in the user's facial expression, head movement, and the user's relative position with respect to the sensor portion 24, but even at least one of these is acceptable. In addition, the sensor portion 24 may acquire other detection data such as detection data that detects movement other than head movement, in addition to or instead of at least one out of the changes in the user's facial expression, the head movement, and the user's relative position.

The virtual space displayed in the video may be an augmented reality (AR) space. For example, animation such as an avatar object and a gift object based on the data sent from the distributing user device 12A may be superimposed and displayed on a real-world image taken by the camera of the viewing user device 12B. Alternatively, the distributing user device 12A may generate a video by superimposing animation such as an avatar object and a gift object on a real-world image taken by its own camera, encode the video, and send the video to the server 13.

In each of the above embodiments, the user device 12 is an information processing device such as a smartphone, a mobile phone, a tablet terminal, a personal computer, a game console, or a wearable computer such as a head-mounted display. Instead of this, the video distribution system may be a system provided in a studio for video distribution. The video distribution system includes an information processing device, a server, the sensor portion 24 mounted on the body of a distributing user, a tracking system for detecting the position of the sensor portion 24, the operation portion 27, the speaker 25, and the display 28. The tracking system may include a multi-axis laser emitter that emits pulsed laser light for synchronization. The sensor portion 24 includes a sensor that detects the laser beam, and detects its own position and orientation while synchronizing with the synchronization pulse. As the sensor portion 24, for example, Vive Tracker (registered trademark) and Vive Base Station (registered trademark) provided by HTC Corporation (registered trademark) can be used. The information processing device performs the first drawing process, the designation process, the trial parts acquisition process, and the second drawing process.

The first drawing process, the designation process, the trial parts acquisition process, the second drawing process, the lottery request process, the lottery data receiving process, the registered parts display process, and the mode switching process may each be executed by one of the user device 12 and the server 13, or by another device constituting the video distribution system 11.

DESCRIPTION OF REFERENCE SYMBOLS

11 Information processing system
12 User device
13 Server

The invention claimed is:

1. A non-transitory computer-readable medium storing thereon a program that causes circuitry of at least one computer to execute:
a first drawing process of outputting, to a display, a video in which at least one registered part associated with a distributing user is applied to an avatar object that reflects movements of the distributing user;
a designation process of sending information designating a lottery target group including a plurality of lottery target parts to a server based on a first input operation to an input operation portion;
a trial parts acquisition process of acquiring trial parts data relating to at least one trial part preset as a part to be temporarily applied to the avatar object from among the lottery target parts included in the lottery target group; and
a second drawing process of outputting, to the display, the avatar object to which the at least one trial part has been automatically applied using the trial parts data, wherein the avatar object is associated with a plurality of avatar attributes, the trial parts data includes trial parts identification information different for each of the avatar attributes, and the second drawing process selects, from the trial parts data, trial parts identification information according to the avatar attribute of the avatar object output to the display, and applies the at least one trial part corresponding to the selected trial parts identification information to the avatar object.

2. The non-transitory computer-readable medium according to claim 1, wherein the program further causes the circuitry to execute:

a lottery request process of sending a request for execution of a lottery from among the lottery target group to the server;

a lottery data receiving process of receiving from the server lottery parts data related to at least one lottery part subject to lottery from among the lottery target group; and a registered parts display process of displaying an image of the lottery parts data included in a registered parts list that displays an image of the at least one registered part associated with the distributing user, wherein the registered parts display process does not display an image of the at least one trial part in the registered parts list.

3. The non-transitory computer-readable medium according to claim 1, wherein the at least one registered part and the at least one trial part are associated with a section of the avatar object, and when applying the at least one trial part to the avatar object, the second drawing process releases application of the at least one registered part and newly applies the at least one trial part when the at least one registered part is already applied to the section.

4. The non-transitory computer-readable medium according to claim 1, wherein the program further causes the circuitry to execute a process of receiving in advance drawing data for drawing the lottery target parts included in the lottery target group from the server, and storing the drawing data in a memory, in the trial parts acquisition process, the trial parts identification information is received, and in the second drawing process, the drawing data corresponding to the trial parts identification information is acquired from the memory and applied to the avatar object.

5. The non-transitory computer-readable medium according to claim 1, wherein the program further causes the circuitry to execute a mode switching process of switching between a distribution mode that distributes the video and a viewing mode that views the video, in accordance with a second input operation to the input operation portion, when, in the distribution mode, the designation process that designates the lottery target group is performed, the second drawing process is executed to display a first image in which the at least one trial part has been applied to the avatar object, and when, in the viewing mode, the designation process is performed, a second image is output to the display, the second image including the avatar object to which the at least one trial part has been applied and a message input portion for sending a message to the distributing user.

6. The non-transitory computer-readable medium according to claim 1, wherein the program further causes the circuitry to execute a mode switching process of switching between a distribution mode that distributes the video and a viewing mode that views the video, in accordance with a second input operation to the input operation portion, when, in the distribution mode, the designation process that designates the lottery target group is performed, the second drawing process is executed to output to the display a first image in which the at least one trial part has been applied to the avatar object, and when, in the viewing mode, the designation process is performed, a second image is output to the display, the second image not including the avatar object to which the at least one trial part has been applied.

7. The non-transitory computer-readable medium according to claim 1, wherein the circuitry outputs to the display a video of a collaborative distribution that includes a plurality of the avatar objects corresponding to a plurality of the distributing users, and applies the same trial part or mutually different trial parts included in the lottery target group to the plurality of the avatar objects participating in the collaborative distribution, when the designation process is performed by the first input operation from one of the plurality of distributing users.

8. The non-transitory computer-readable medium according to claim 1, wherein each of the lottery target parts included in the lottery target group belongs to one of a plurality of categories, and a plurality of the trial parts is applied to the avatar object, each of the trial parts belonging to different ones of the categories.

9. An information processing method by circuitry of at least one computer, the method comprising:

a first drawing process of outputting, to a display, a video in which at least one registered part associated with a distributing user is applied to an avatar object that reflects movements of the distributing user;

a designation process of sending information designating a lottery target group including a plurality of lottery target parts to a server based on a first input operation to an input operation portion;

a trial parts acquisition process of acquiring trial parts data relating to at least one trial part preset as a part to be temporarily applied to the avatar object from among the lottery target parts included in the lottery target group; and a second drawing process of outputting, to the display, the avatar object to which the at least one trial part has been automatically applied using the trial parts data, wherein, the avatar object is associated with a plurality of avatar attributes, the trial parts data includes trial parts identification information different for each of the avatar attributes, and the second drawing process selects, from the trial parts data, trial parts identification information according to the avatar attribute of the avatar object output to the display, and applies the at least one trial part corresponding to the selected trial parts identification information to the avatar object.

10. A server comprising:

circuitry configured to execute:

a parts sending process of sending, to a user device, drawing data for drawing at least one part to be applied to an avatar object in which movements of a distributing user are reflected;

a designation receiving process of receiving, from the user device, information designating a lottery target group including a plurality of lottery target parts that are lottery targets;

a trial parts sending process of sending, to the user device, trial parts data related to at least one trial part preset as a part to be temporarily applied to the avatar object from among the lottery target parts included in the lottery target group;

a lottery request receiving process of receiving, from the user device, an execution request for a lottery from among the lottery target group;

a lottery execution process of executing the lottery for a predetermined number of the lottery target parts from the lottery target group; and a lottery data sending process of sending, to the user device, lottery parts data associated with a first lottery part drawn from the lottery target group, wherein the avatar object is associated with a plurality of avatar attributes, the trial parts data includes trial parts identification information different for each of the avatar attributes, and the at least one trial part to be applied to the avatar object corresponds to trial parts identification information selected from the trial parts data according to the avatar attribute of the avatar object.

11. A server information processing method by circuitry, the method comprising:

a parts sending process of sending, to a user device, drawing data for drawing at least one part to be applied to an avatar object in which movements of a distributing user are reflected;

a designation receiving process of receiving, from the user device, information designating a lottery target group including a plurality of lottery target parts that are lottery targets;

a trial parts sending process of sending, to the user device, trial parts data related to at least one trial part preset as a part to be temporarily applied to the avatar object from among the lottery target parts included in the lottery target group;

a lottery request receiving process of receiving, from the user device, an execution request for a lottery from among the lottery target group;

a lottery execution process of executing the lottery for a predetermined number of the lottery target parts from the lottery target group; and a lottery data sending process of sending, to the user device, lottery parts data associated with a first lottery part drawn from the lottery target group, wherein the avatar object is associated with a plurality of avatar attributes, the trial parts data includes trial parts identification information different for each of the avatar attributes, and the at least one trial part to be applied to the avatar object corresponds to trial parts identification information selected from the trial parts data according to the avatar attribute of the avatar object.

\* \* \* \* \*